United States Patent
Shamir et al.

(10) Patent No.: US 8,761,445 B2
(45) Date of Patent: Jun. 24, 2014

(54) METHOD AND SYSTEM FOR DETECTION AND TRACKING EMPLOYING MULTI-VIEW MULTI-SPECTRAL IMAGING

(75) Inventors: Hanan Shamir, Binyamina (IL); Liat Berger, Haifa (IL); Eliyahu Tell, Haifa (IL); Ilan Efrat, Haifa (IL)

(73) Assignee: Elbit Systems Ltd., Haifa (IL)

( * ) Notice: Subject to any disclaimer, the term of this patent is extended or adjusted under 35 U.S.C. 154(b) by 176 days.

(21) Appl. No.: 13/580,247

(22) PCT Filed: Mar. 10, 2011

(86) PCT No.: PCT/IL2011/000237
§ 371 (c)(1),
(2), (4) Date: Oct. 23, 2012

(87) PCT Pub. No.: WO2011/101856
PCT Pub. Date: Aug. 25, 2011

(65) Prior Publication Data
US 2013/0034266 A1     Feb. 7, 2013

(30) Foreign Application Priority Data

Feb. 21, 2010  (IL) .......................................... 204089

(51) Int. Cl.
*G06K 9/00* (2006.01)
*H04N 7/18* (2006.01)

(52) U.S. Cl.
USPC ............................ 382/103; 382/291; 348/143

(58) Field of Classification Search
USPC ......... 382/100, 103, 106–107, 116–118, 155, 382/162, 168, 173, 181, 189–199, 209, 232, 382/254, 274, 276, 291, 305, 312; 348/149, 348/143, 158; 342/52; 340/539.26
See application file for complete search history.

(56) References Cited

U.S. PATENT DOCUMENTS

| | | | |
|---|---|---|---|
| 5,559,496 A * | 9/1996 | Dubats | 340/539.26 |
| 6,985,172 B1 * | 1/2006 | Rigney et al. | 348/149 |
| 2004/0130620 A1 * | 7/2004 | Buehler et al. | 348/143 |
| 2008/0129581 A1 * | 6/2008 | Douglass et al. | 342/52 |
| 2012/0274775 A1 * | 11/2012 | Reiffel | 348/158 |

OTHER PUBLICATIONS

International Search Report and Written Opinion issued in connection with PCT/IL2011/000237, dated Sep. 19, 2011. 11 pages.

* cited by examiner

*Primary Examiner* — Seyed Azarian
(74) *Attorney, Agent, or Firm* — Vedder Price P.C.

(57) ABSTRACT

Multi view multi spectral detection and tracking system comprising at lease one imager, at least one of the at least one imager being a multi spectral imager, the at least one imager acquiring at least two detection sequences, and at least two tracking sequences, each sequence including at least one image, each acquired image being associated with respective image attributes, an object detector, coupled with the at least one imager, detecting objects of interest in the scene, according to the detection sequence of images and the respective image attributes, an object tracker coupled with the object detector, the object tracker tracking the objects of interest in the scene and determining dynamic spatial characteristics and dynamic spectral characteristics for each object of interest according to the tracking sequences of images and the respective image attributes and an object classifier, coupled with the object tracker, classifying the objects of interest according to the dynamic spatial characteristics and the dynamic spectral characteristics.

50 Claims, 10 Drawing Sheets

METHOD AND SYSTEM FOR DETECTION AND TRACKING EMPLOYING MULTI-VIEW MULTI-SPECTRAL IMAGING

FIELD OF THE DISCLOSED TECHNIQUE

The disclosed technique relates to surveillance and security, in general, and to methods and system for detecting, tracking and classifying objects of interest in a scene according to multi-spectral images acquired from a plurality of positions in the scene, in particular.

BACKGROUND OF THE DISCLOSED TECHNIQUE

Surveillance and security systems are known in the art. Such systems are generally used, for example, in airports, malls, factories and various types of buildings (e.g., office buildings, hospitals, laboratories etc.). Such a surveillance and security system generally includes imagers for acquiring images of an observed scene (e.g., a gate at an airport, the lobby of a building, the perimeter of a factory). The objects in the acquired images are tracked and classified either by a user observing the images or automatically.

U.S. Pat. No. 6,985,172, to Rigney et al., entitled "Model-Based Incident Detection System with Motion Classification" is directed to a surveillance apparatus and methods for detecting incidents. The surveillance system includes a motion detection unit, a digital computer, a visible spectrum video camera, a frame-grabber, a wireless transmitter and an infrared camera. The digital computer includes an input-output means, a memory, a processor, a display and a manually-actuated input means. The computer input-output means includes a wireless receiver and an infrared frame-grabber. The visible spectrum video camera is coupled to the frame-grabber and wirelessly coupled to the transmitter. The transmitter wirelessly corresponds to the receiver. The infrared camera is coupled to the infrared frame-grabber of the computer input-output means. The display and the processor are coupled to the computer input-output means. The manually-actuated input means and the memory are coupled to the processor.

The motion detection unit generates a reference image of a scene, which does not contain any motion objects, and generates a temporal difference image between acquired images and the reference image. Accordingly, the motion detection unit detects motion objects in a particular image and generates a low-level detection motion image (i.e., an image including only the motion objects). Thereafter the motion detection unit spatially and temporally analyzes the low-level detection motion. The spatial analysis includes extracting spatial features according to the low-level detection motion image and the original image (e.g., size shape position, texture and moments of intensity values) and classifies the detected objects (e.g., according to set points, statistics or parametric criteria). The temporal analysis includes object tracking and statistical motion analysis. The motion detection unit then recognizes anticipated or unanticipated motion of the object according to a model-based motion analysis.

U.S. Patent Application Publication US2008/0129581 to Douglass et al., entitled "System and Method for Standoff Detection of Human Carried Explosives" is directed, in one embodiment therein, to a system, which includes RADAR and video cameras. The RADAR transmits an electromagnetic beam which exhibits at least one transmit polarization and at least one receive polarization. At least one video camera is a Wide Field Of View (WFOV) camera and at least one other video camera is a Narrow Field Of View (NFOV) camera. The video cameras may be multi-spectral or hyperspectral video cameras. The WFOV camera collects video data and transmits the data to a processor, which applies motion detection and segmentation software implemented algorithms to separate moving objects from stationary background. A two-sided composite hypothesis test is then applied to classify each detected moving object as being either "human" or "other". A database of constraints on human characteristics is utilized to classify the object type of each moving object detected. This database contains data elements including, for example, size, shape, thermal profile (i.e., applicable for Infrared or multi-spectral cameras), color (i.e., applicable for color cameras) and motion as an aid in classifying object type. Moving objects that are not consistent with human motion are discarded from further consideration. Detected moving objects that have been classified as human-like are then sent to the motion tracker module along with the video stream collected by the WFOV camera. Information passed to a motion tracker module by a motion detector module includes the video frame number, mask or region of interest delimiters that describe the location of the moving object in the video frame, and the ancillary statistics used in the two-sided composite hypothesis test. The motion tracker module then generates and maintains a track for each object cued by the motion detector module. Tracks are maintained until the object leaves the field of view of the WFOV camera.

A threat motion analysis module examines each track based upon a database of stored characteristics, and determines the threat potential of the moving track. The database contains measurements or parameters that have been characterized as threat motions, either by an operator or from analysis of past threats. These characteristics may take the form of region constraints such as, "anybody who enters this demarked area is considered a threat", or may consist of time and region constraints such as, "anybody who enters the demarked area at the wrong time". Other threats could be someone moving toward the protected area at a higher rate of speed than other objects in the area. An alternate strategy would have the threat motion analysis module compare the motion statistics of new tracks to the database estimates of "normal" motion statistics within the surveillance area to determine if the motion of the tracked object represents an anomaly.

At any one time, a track may be classified as a "threat", a "non-threat", or "indeterminate". The threat motion analysis module operates to detect dynamic or emerging threats in the presence of uncertainty by applying a sequential hypothesis test. A sequential hypothesis test is a statistic-based test known to those skilled in the art of statistics. Unlike a normal hypothesis test which outputs a binary "yes/no" answer, a sequential hypothesis test allows for a third answer, "don't know, collect more data". The idea is that at each point in time, the system collects additional information until it has enough information to make a decision about a given hypothesis. Preset or operator selected parameters within the sequential hypothesis test enable the cost of collecting more data to be incorporated into the optimization. With "indeterminate" threats, the hypothesis test is sequentially reapplied with each new observation until a threat determination can be made or the object has left the field of view. Note that the definition of a threatening motion can vary depending on the scenario. Threatening motions could be defined as an object with a motion vector toward the protected area and/or motion velocities that are markedly different from the average velocity of other objects in the field of view. A plurality of human carried explosives detection systems may be employed and networked to form a collaborative detection and tracking system.

U.S. Patent Application Publication US2004/0130620 to Buehler et al., entitled "Method and System for Tracking and Behavioral Monitoring of Multiple Objects Moving Through Multiple Fields-Of-View" is directed to a system and method of video analysis of frames from a plurality of image sensors (e.g., visible light or infrared sensors). Each image sensor has its own field-of-view (FOV) which may overlap with the FOV of another image sensor. The image sensors monitor a monitored environment. The method includes concurrently tracking, independent of calibration, multiple objects within the monitored environment as the objects move between FOVs, and multiple objects move within one FOV.

The video analysis system may include a receiving module, a tracking module (also referred to as a "tracker"), a classifier and a rules engine. According to one embodiment therein, the receiving module receives a plurality of series of video frames from a plurality of cameras and provides the video frames to the tracking module. The tracking module concurrently tracks a plurality of objects both within an FOV of a single camera and within the FOVs of multiple cameras. The output of the tacking module may be stored in a database. The classifier may perform two different types of classification, static classification and dynamic classification. Static classification refers to a classification procedure that operates on a group of pixels from a single instant in time (i.e., from a single frame of video). This type of classification may include assigning instantaneous properties of the pixel group to the pixel group. These properties may include, for example, size, color, texture, or shape to determine if the group of pixels is of interest. Dynamic classification refers to classification rules that examine a pixel group over a period of time to make the classification. For example, dynamic classification properties include velocity, acceleration, change in size, change in area, change in color, lack of motion, or any time dependent property.

The classifier may include a first pass classifier that is used to remove noisy pixels and other artifacts or external variables. A second pass classifier is used in correlation with the output of the tracking module. This interaction includes any combination of spatial, temporal, image feature and motion output from a tracking system. The second pass classifier looks at the data from the tracking module and compares it with data from other frames. Characteristics of followed objects are analyzed along with a state history of that particular object. Various predetermined characteristics of the pixel group are used. For example, motion information (e.g., velocity), grouping information, and appearance/signature information. The rules engine evaluates tracking data to determine whether specific conditions have been met and may also allow users to search for specific information created by the tracking module that in some instances may also have been processed by the classifier.

SUMMARY OF THE PRESENT DISCLOSED TECHNIQUE

It is an object of the disclosed technique to provide a novel method and system for multi-view and multi-spectral surveillance. In accordance with the disclosed technique, there is thus provided multi-view multi-spectral surveillance system, which includes at lease one imager, an object detector, an object tracker and an object classifier. The object detector is coupled with the at least one imager. The object tracker is coupled with the object detector. The object classifier is coupled with the object tracker. The at least one imager acquires at least two detection sequences, and at least two tracking sequences. Each sequence includes at least one image, each acquired image being associated with respective image attributes. The object detector detects objects of interest in the scene, according to the detection sequence of images and the respective image attributes. The object tracker tracks the objects of interest in the scene. The object tracker determines dynamic spatial characteristics and dynamic spectral characteristics for each object of interest according to the tracking sequences of images and the respective image attributes. The object classifier classifies the objects of interest according to the dynamic spatial characteristics and the dynamic spectral characteristics.

In accordance with another aspect of the disclosed technique, there is thus provided a multi-view multi-spectral surveillance method. The method comprises the procedures of acquiring at least two detection sequences of images of the scene and detecting objects of interest and determining initial object characteristics according to according to the detection sequence of images and the respective image attributes. The method further includes the procedures of acquiring at least two tracking sequences of images of the scene, tracking the objects of interest in the scene according to the sequences of images and determining dynamic spatial and spectral characteristics of each the objects of interest according to tracking sequences of images and the respective image attributes. The method also includes the procedure of classifying each of the objects of interest according to a respective object classification model respective of each object of interest. Each image in the detection sequence or in the tracking sequence including at least one image, each image being associated with respective image attributes.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1A:
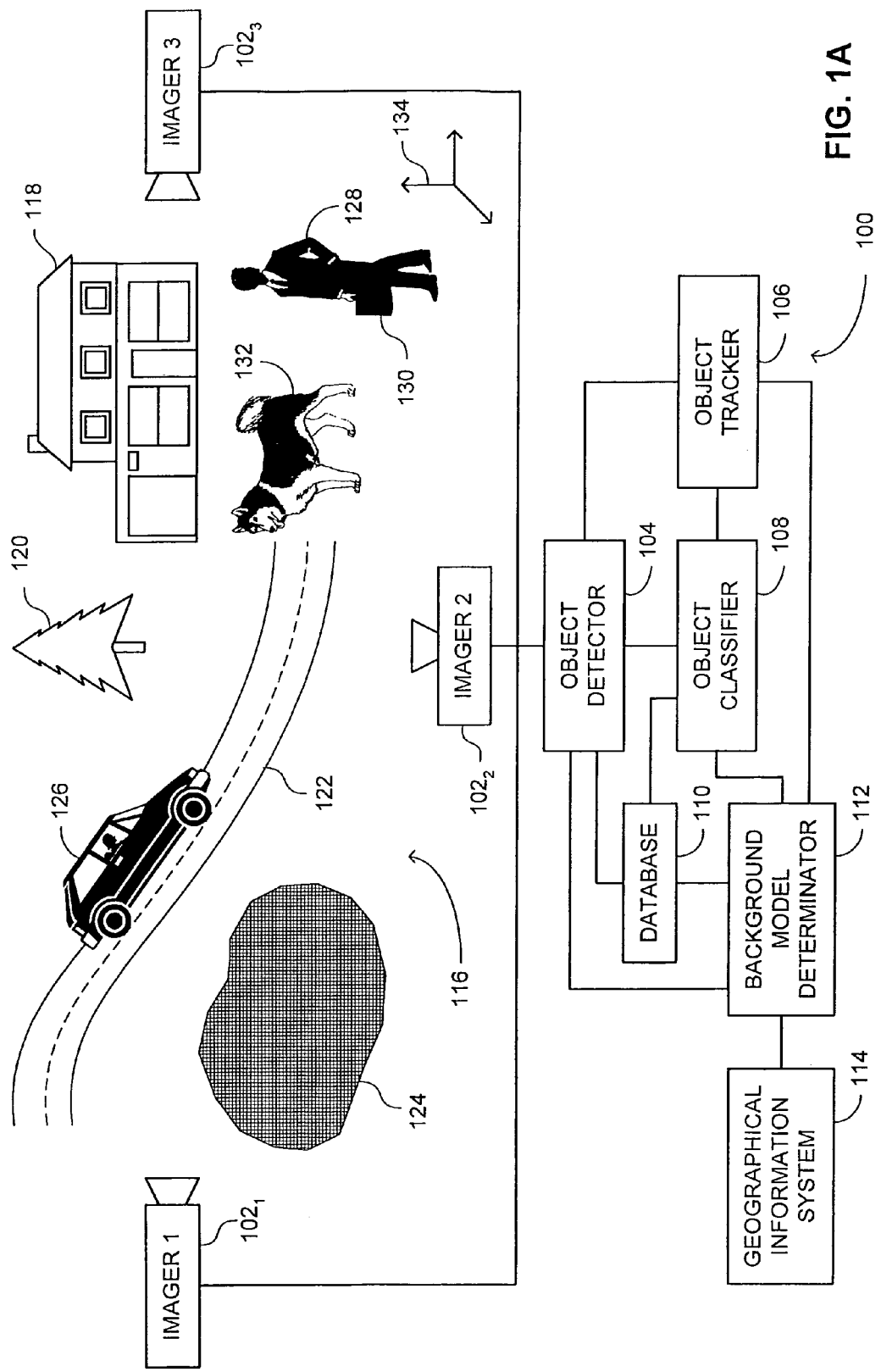
FIG. 1A is a schematic illustration of a multi-view multi-spectral detection and tracking system, constructed and operative in accordance with an embodiment of the disclosed technique.

The disclosed technique overcomes the disadvantages of the prior art by providing a surveillance system and method for detecting, tracking and classifying objects of interest in a scene according to images acquired at a plurality of spectral bands (i.e., multi-spectral images) from different viewing angles of the scene. According to the disclosed technique, each of a plurality of imagers is located at a different position in the scene. At least one of the imagers is a multi-spectral imager and the remaining ones of the imagers are visual imagers (i.e., acquiring images in the visible spectral band). Each imager is associated with respective imager characterizing parameters (e.g., Pan, Tilt, Zoom, relative position of the imager). Each one of the imagers acquires a detection sequence of images (i.e., visual images or the multi-spectral images) and provides the acquired detection sequence of images to an object detector. Each image in the detection sequence is associated with respective image attributes (e.g., the spectral band of the image, a respective time stamp and respective imager characterizing parameters). The object detector detects objects of interest in the scene relative to a background model of the scene. Initially, the object detector pre-processes the acquired images. This pre-processing can include registering and segmenting the acquired images. The object detector identifies segments, which appear in the images, but do not appear in the background model of the scene, thereby identifying segments of interest. The Object detector further identifies segments of interest in the different images acquired by different imagers as corresponding to the same object in the scene. Thereafter, the object detector determines initial spatial and spectral characteristics, respective of each segment of interest and identifies objects in the scene corresponding to these segments of interest. The object detector selects objects of interest from the identified objects in the scene according to the initial spatial and spectral characteristics.

In addition to the detection sequence, the imagers acquire a tracking sequence of images of the scene and provide the acquired tracking sequences to an object tracker. Each image in the tracking sequence is also associated with respective image attributes. The object tracker tracks the detected objects of interest and determines dynamic spatial and spectral characteristics respective of the tracked objects. An object classifier determines an object model respective of each of the objects of interest, according to the dynamic spatial and spectral characteristics associated with each object of interest. The object classifier then classifies the objects of interest according to the object models associated with the objects of interest and according to object lo models of known objects stored in a database. It is noted that herein an object refer to a physical object in the scene and segments refer to a sets of neigbouring pixels exhibitign at least one common feature.

Reference is now made to FIG. 1A, which is a schematic illustration of a multi-view multi-spectral detection and tracking system, generally referenced 100, constructed and operative in accordance with an embodiment of the disclosed technique. System 100 tracks and classifies objects of interest in scene 116. Scene 116 includes, for example, various background objects such as a house 118, a tree 120, a road 122 and a lake 124 (i.e., substantially stationary objects). Scene 116 may further include moving objects such as a car 126, a person 128 carrying a suitcase 130, and a dog 132. Scene 126 is associated with a three-dimensional (3D) reference coordinate system 134.

System 100 includes imagers $102_1$, $102_2$ and $102_3$, an object detector 104, an object tracker 106, an object classifier 108, a database 110, a background model determinator 112 and a Geographical Information System (GIS) 114. At least one of imagers $102_1$, $102_2$ and $102_3$ is a multi-spectral imager and the remaining ones are visual imagers. The multi-spectral imager acquire images at a plurality of spectral bands (e.g., Near Infrared—NIR, Short Wave Infrared—SWIR, Mid Wave infrared—MWIR and Long Wave Infrared—LWIR, Ultraviolet; and Millimeter wave)

Object detector 104 is coupled with imagers $102_1$, $102_2$ and $102_3$, with object tracker 106, with object classifier 108 and with background model determinator 112. Object classifier 108 is further coupled with object tracker 106, with background model determinator 112 and with database 110. Background model determinator 112 is further coupled with database 110 and with GIS 114.

Prior to object tracking and classification, automatic background model determinator 112 determines and updates a background model of scene 116. This background model may be, for example, an aerial photograph of scene 116. The background model may further be a Digital Terrain Map (DTM) of scene 116. Alternatively, background model determinator 112 determines the background model according to spatial and spectral analysis of background objects in the scene (e.g., motion of tree 120 in the wind, statistical and spectral analysis in both space and time domains) and according to a terrain model of scene 116. The background model is associated with a respective coordinate system. This coordinate system is registered with coordinate system 134. Background model determinator 112 is further explained below.

During tracking and classification, each one of imagers $102_1$, $102_2$ and $102_3$ is located at a different position in scene 116 and hence in a different position in reference coordinates system 134. Furthermore, each one of imagers $102_1$, $102_2$ and $102_3$ is independently controlled by a Pan Tilt and Zoom (PTZ) controller. Accordingly, each one of imagers $102_1$, $102_2$ and $102_3$ is associated with respective imager characterizing parameters (e.g., Pan, Tilt, Zoom and the relative position of the imager). During tracking and classification, each one of imagers $102_1$, $102_2$ and $102_3$ acquires a detection sequence of images of scene 116 (i.e., each one of the imagers acquires a respective sequence from a different viewing angle of scene 116). Each detection sequence may be a portion of a tracking and classification sequence acquired by each imager. Thus, each image in these detection sequences is associated with respective image attributes. These image attributes include the spectral band of the image (e.g., visible, NIR, SWIR, LWIR), a respective time stamp (i.e., when the image was acquired) and respective imager characterizing parameters (i.e., corresponding to the imager that acquired the image). It is noted that each of the images acquired by the same imager may be associated with a different image attributes since, for example, the pan, the tilt, the zoom and the time stamp may change during the acquisition of the detection sequence. Furthermore, the imager may move during the acquisition of the detection sequence. It is further noted that three imagers are described herein only as an example. In general, according to the disclosed technique, at least two imagers, located at different positions in the scene, are sufficient where one of these two images is a multi-spectral imager. It is also noted that a single imager may be used. This single imager sequentially moves between different known acquisition positions. For example, the image is located on a vehicle or on an aircraft. Furthermore, two or more imagers, moving between acquisition positions may also be used.

Figure 1B:
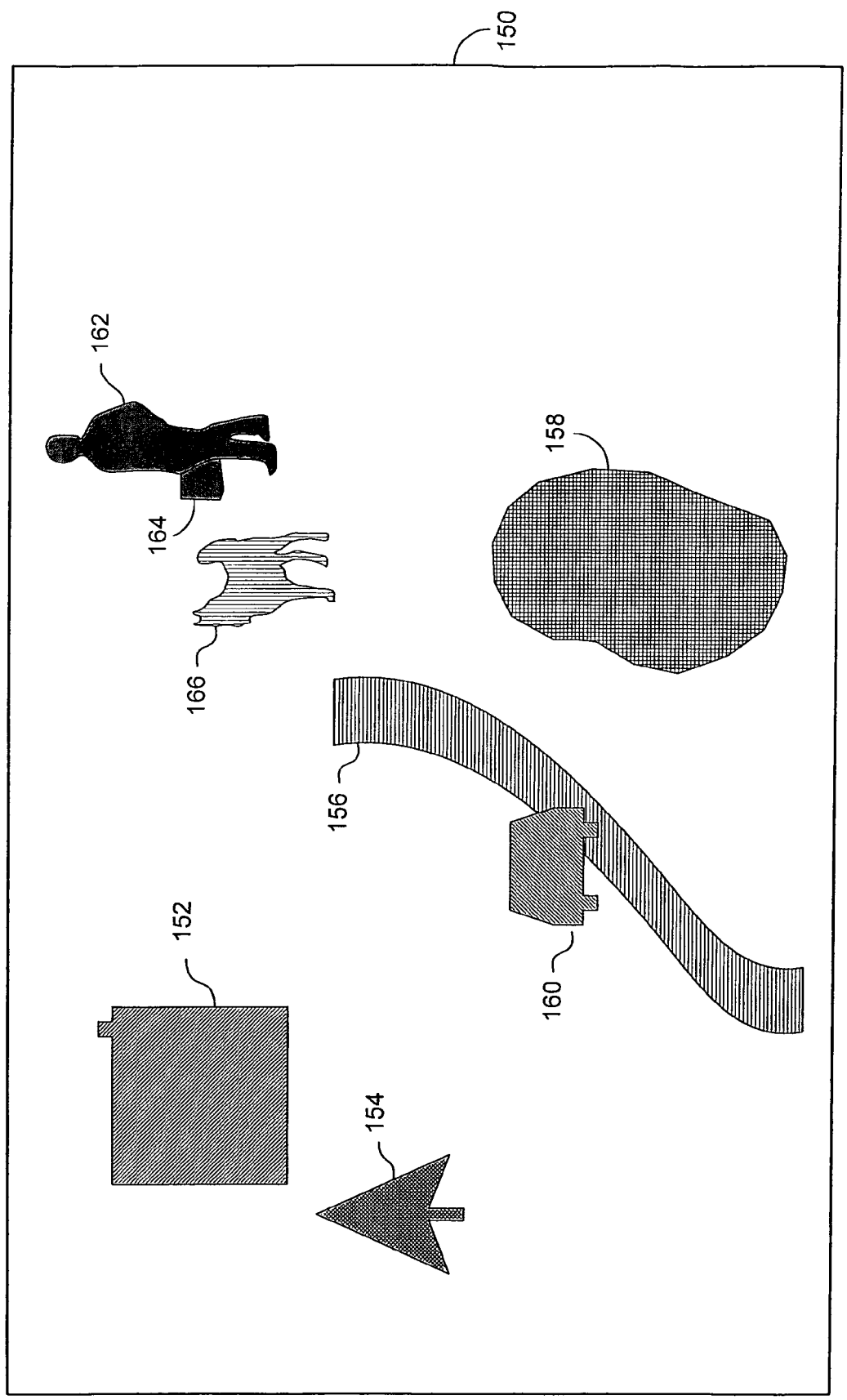
FIGS. 1B, 1C and 1D are schematic illustrations of exemplary segmented images of the scene of FIG. 1A, in accordance with an embodiment of the disclosed technique.
Figure 1C:
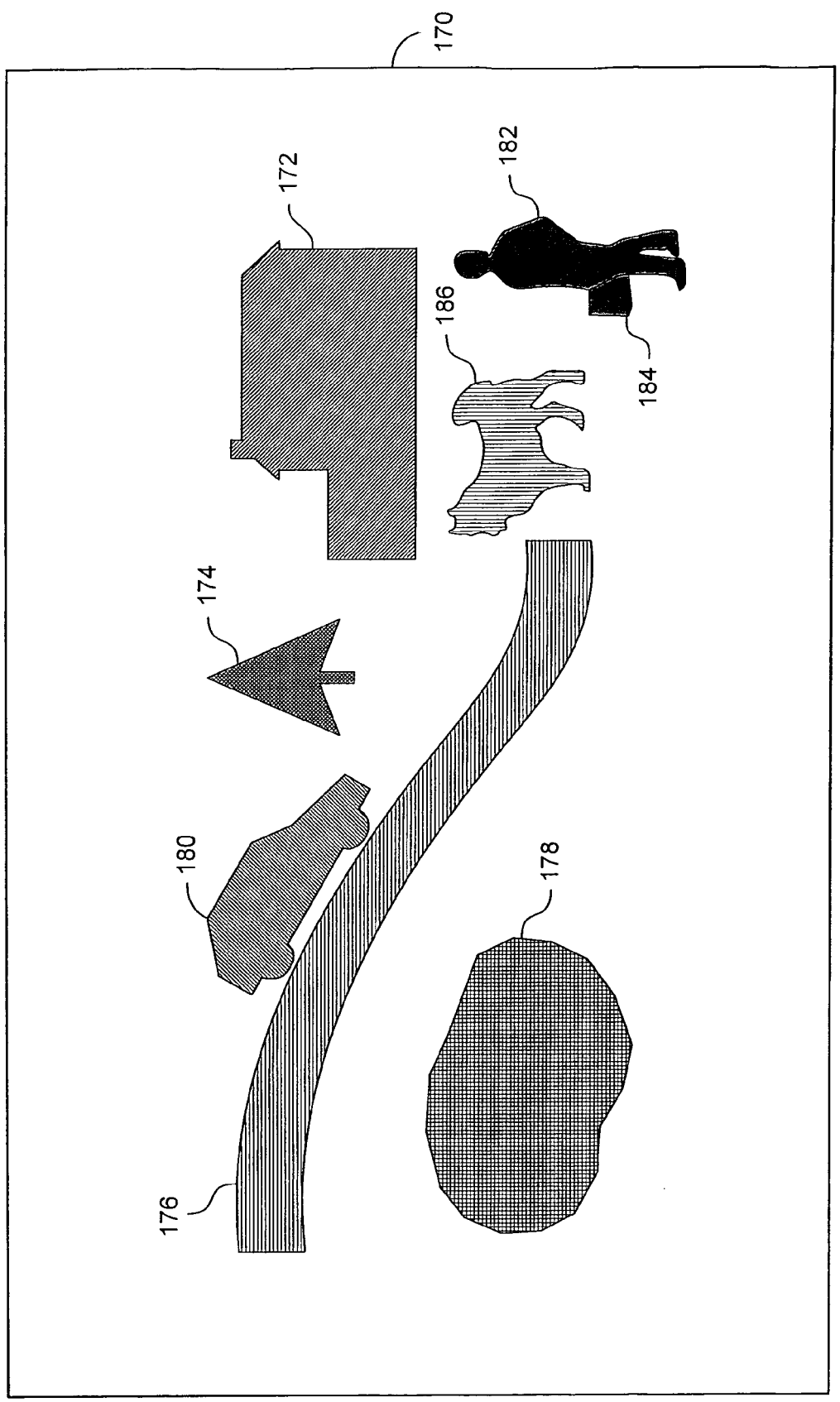
Figure 1D:
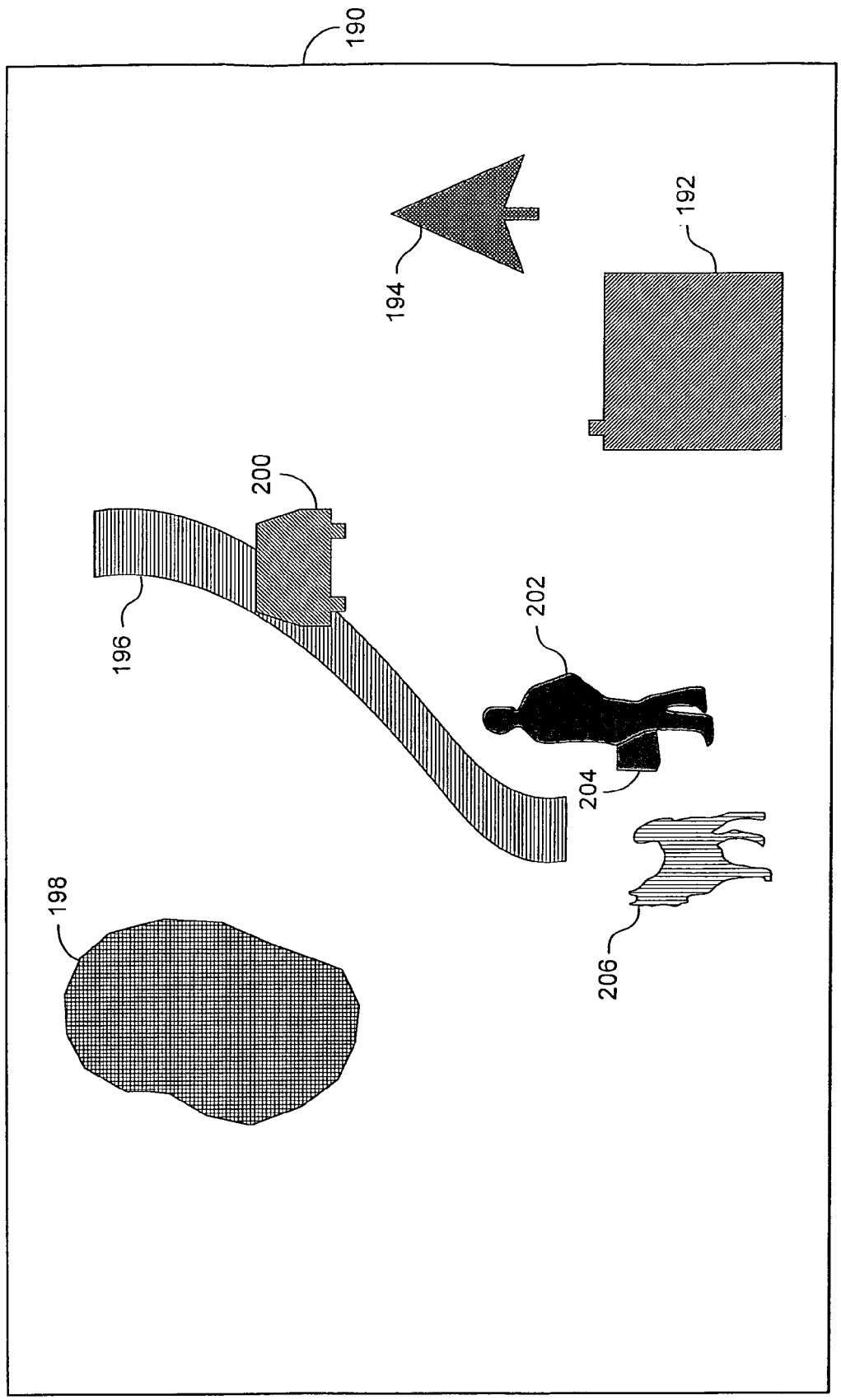

Each one of imagers $102_1$, $102_2$ and $102_3$ provides the respective acquired detection sequence of images to object detector 104 with the respective image attributes associated with each image. Initially object detector 104 pre-process the acquired images. This pre-processing includes image registration and segmentation. The result of image segmentation are segmented images, where each segment corresponds to an object or a portion of an object in scene 116 (i.e., there can be more than one segment corresponding to the same object). The pre-processing may further include image stabilization and filtering. Object detector 104 then identifies segments of interest. Object detector 104 identifies segments which appear in an image acquired by one imager (i.e., which is associated with respective image attributes), but do not appear in a background image exhibiting similar image attributes, as segments of interest. Furthermore, Object detector 104 identifies segments in different images acquired by different imagers, which correspond to the same object in the scene as segments of interest. Reference is now made to FIGS. 1B, 1C and 1D which are schematic illustration of exemplary segmented images 150, 170 and 190 respectively of scene 116 (FIG. 1A), in accordance with an embodiment of the disclosed technique. Image 150 was acquired by imager $102_1$, image 170 was acquired by imager $102_2$ and image 190 was acquired by imager $102_3$. Segments 152 (FIG. 1B), 172 (FIG. 1C) and 192 (FIG. 1D) correspond to house 118 (FIG. 1A). Segments 154 (FIG. 1B), 174 (FIG. 1C) and 194 (FIG. 1D) correspond to tree 120 (FIG. 1A). Segments 156 (FIG. 1B), 176 (FIG. 1C) and 196 (FIG. 1D) correspond to road 122 (FIG. 1A). Segments 158 (FIG. 1B), 178 (FIG. 1C) and 198 (FIG. 1D) correspond to lake 124 (FIG. 1A). Segments 160 (FIG. 1B), 180 (FIG. 1C) and 200 (FIG. 1D) correspond to car 126 (FIG. 1A). Segments 162 (FIG. 1B), 182 (FIG. 1C) and 202 (FIG. 1D) correspond to man 128 (FIG. 1A). Segments 164 (FIG. 1B), 184 (FIG. 1C) and 204 (FIG. 1D) correspond to suitcase 130 (FIG. 1A). Segments 166 (FIG. 1B), 186 (FIG. 1C) and 206 (FIG. 1D) correspond to dog 132 (FIG. 1A). For example, object detector 104 identifies segments 160, 180 and 200 as corresponding to car 126, segments 162, 182 and 202 which corresponding to man 128, segments 164, 184 and 204 which corresponding to suitcase 130 and segments 166, 186 and 206 which corresponding to dog 132 as segments of interest since these segments appear images 150, 170 and 190 but do not appear in the background model of scene 116.

After the pre-processing, object detector 104 determines initial spatial characteristic and initial spectral characteristics respective of each segment of interest according to the image attributes of the image in which the segment is located. Thus, the initial spatial and spectral characteristics respective of each segment of interest are also associated with the object corresponding to that segment. Object detector identifies objects in scene 116 according to the initial spatial and spectral characteristics corresponding to the segments of interest. Object detector 104 selects objects of interest from the identified objects in scene 116. It is noted that the initial spectral characteristics corresponding to each segment are determined according to the images acquired by the multi-spectral imager or imagers whereas the initial spatial characteristics corresponding to each segment are determined according to the images acquired by all of the imagers. For example, object detector selects car 126, person 128 and suitcase 130 as object of interest. However, dog 132 is of no interest. Object detector 104 will further be explained in conjunction with FIG. 3. Object detector 104 provides the segments corresponding to the objects of interest to object tracker 106. Additionally, object detector 104 provides the segments corresponding to the objects of interest and the respective initial spatial and spectral characteristics thereof to object classifier 108. Object classifier 108 performs an initial classification (e.g., vehicle, human) of the objects of interest according to the initial spatial and spectral characteristics.

Each one of imagers $102_1$, $102_2$ and $102_3$ further acquires a tracking sequence of images of scene 116. This, tracking sequence may be a portion of the tracking and classification sequence. (i.e., the detection sequence portion and the tracking sequence portion in the tracking and classification sequence may be mutually exclusive or at least partially overlap). Each image in the tracking sequences is also associated with respective image attributes. Similar to the images in the detection sequences, each of the images acquired by the same imager may be associated with different image attributes. Each one of imagers $102_1$, $102_2$ and $102_3$ provides the respective acquired tracking sequence of images to object tracker 106 with the respective image attributes associated with each image. Object tracker 106 tracks the detected objects of interest in scene 116 and determines dynamic spatial and spectral characteristics for each tracked object. These dynamic spatial and spectral characteristics are determined from the images in the tracking sequence according to the respective image attributes. Object tracker 106 may receive information from object classifier 108 while tracking the selected objects, thus enhancing the tracking capabilities thereof. Object tracker 106 provides these dynamic spatial and spectral characteristics respective of each tracked object, to object classifier 108. In general, object tracker 106 may continue to track the objects of interest in the scene (e.g., to continuously determine the locations of the objects of interest in the scene) after determining the dynamic spatial and spectral characteristics of the objects.

Object classifier 108 performs a refined classification of the object of interest in scene 116 (e.g., the human is a man or the vehicle is a car). For each object of interest, object classifier 108 determines an object model respective thereof according to the dynamic spatial and spectral characteristics associated with each object of interest. Object classifier classifies each object of interest according to the respective object model thereof. Objects classifier 108 is further explained in conjunction with FIG. 5. It is noted that, in general, object classifier 108 classifies objects according to information in three spatial domains, the one time domain and the spectral domain (i.e., in multiple spectral bands).

Figure 2:
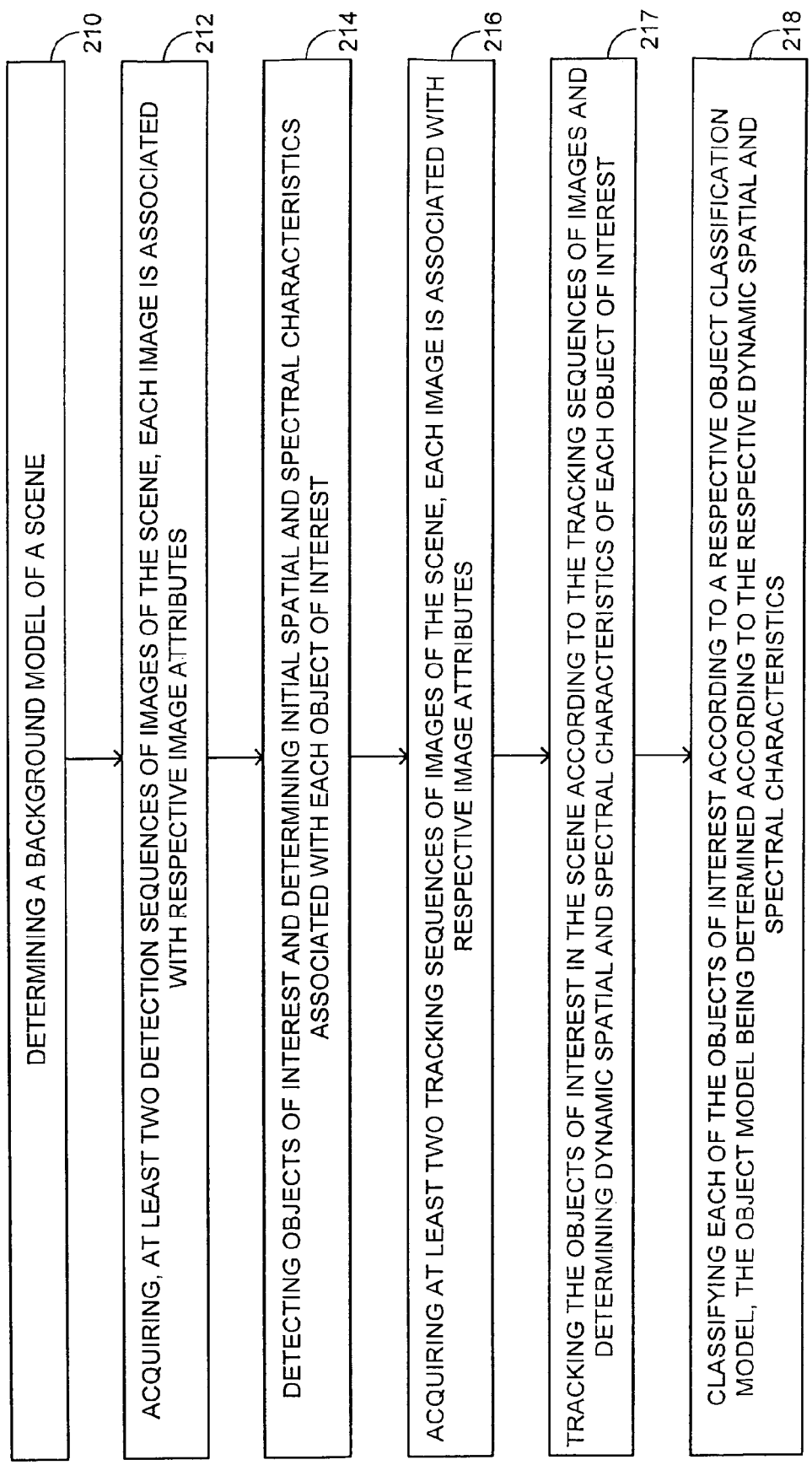
FIG. 2 is a schematic illustration of a method for multi-view multi-spectral detection and tracking, operative in accordance with another embodiment of the disclosed technique.

Reference is now made to FIG. 2, which is a schematic illustration of a method for multi-view multi-spectral tracking and detection, operative in accordance with another embodiment of the disclosed technique. In procedure 210, a background model of a scene is determined according to spatial analysis and spectral analysis and according to a 3D terrain model of a scene. Alternatively, this background model may be an aerial photograph or a DTM of the scene. With reference to FIG. 1, background model determinator 112 determines a background model of scene 116.

In procedure 212, at least two detection sequences of images of the scene are acquired. At least one image in one of the detection sequence is a multi-spectral image. Each image in the sequences is associated with respective image attributes. The two detection sequences may be acquired by a single imager sequentially positioned at different location in the scene or by different imagers located at different positions in the scene. These detection sequences may be a portion of the tracking and classification sequence. With reference to FIG. 1, each one of imagers $102_1$, $102_2$ and $102_3$ acquires a detection sequence of images.

In procedure 214, objects of interest are detected and initial spatial and spectral characteristics associated with each object of interest are determined. Initially, the acquired images are pre-processed. This pre-processing includes image stabilization, image registration and image segmentation. The pre-processing may further include filtering the images (e.g., using a Weiner filter, using a Gaussian filter, using a SIFT/SURF or a Harris filter). Each segment corresponds to an object in the scene. After the pre-processing, segments of interest are identified. Segments which appear in an image acquired by one imager but do not appear in a background image acquired by the same imager are identified as segments of interest. Furthermore, segments in the different images acquired by different imagers which corresponding to the same object in the scene, are identified as segments of interest. Respective initial spatial characteristic and initial spectral characteristics are determined for each segment of interest, according to the respective image attributes. Thus, the initial spatial and spectral characteristics respective of each segment of interest are also associated with the object corresponding to that segment. Thereafter, objects in the scene are identified and objects of interest are selected from the objects in the scene, according to the initial spatial and spectral characteristics associated with the objects in the scene. Detecting objects of interest is further explained below in conjunction with FIG. 4. With reference to FIG. 1, object detector 106 detects objects of interest.

In procedure 216, at least two tracking sequences of images of the scene are acquired. At least one of the images in the tracking sequence is a multi-spectral image. Each image in the tracking sequence is associated with a respective image attributes. The two tracking sequences may be acquired by a single imager sequentially positioned at different location in the scene or by different imagers located at different positions in the scene. This tracking sequence may be a portion of the tracking and classification sequence. With reference to FIG. 1, each one of imagers $102_1$, $102_2$ and $102_3$ acquires a tracking sequence of images.

In procedure 217, the objects of interest are tracked in the scene according to tracking sequences of images. Furthermore, dynamic spatial and spectral characteristics are determined for each object of interest. These dynamic spatial and spectral characteristics are determined according to the image attributes associated with each image. These dynamic object characteristics include spatial and spectral object characteristics (e.g., trajectory of the object in a 3D reference coordinate system and changes in the spectral signature of the object over time respectively). With reference to FIG. 1, object tracker 106 tracks the objects of interest in the scene according to the sequences of images and determines dynamic object characteristics.

In procedure 218, the objects of interest are classified according to respective object models thereof. An object model, respective of each object of interest, is determined. This object model is determined according to the dynamic spatial and spectral characteristics associated with each object on interest. The object model is for example a table of object features determined according to the object characteristics. The objects of interest are classified by comparing the respective object models thereof with stored object models of known objects. Classifying the object of interest is further explained in conjunction with FIG. 6. With reference to FIG. 1, object classifier 110 classifies the object of interest.

Figure 3:
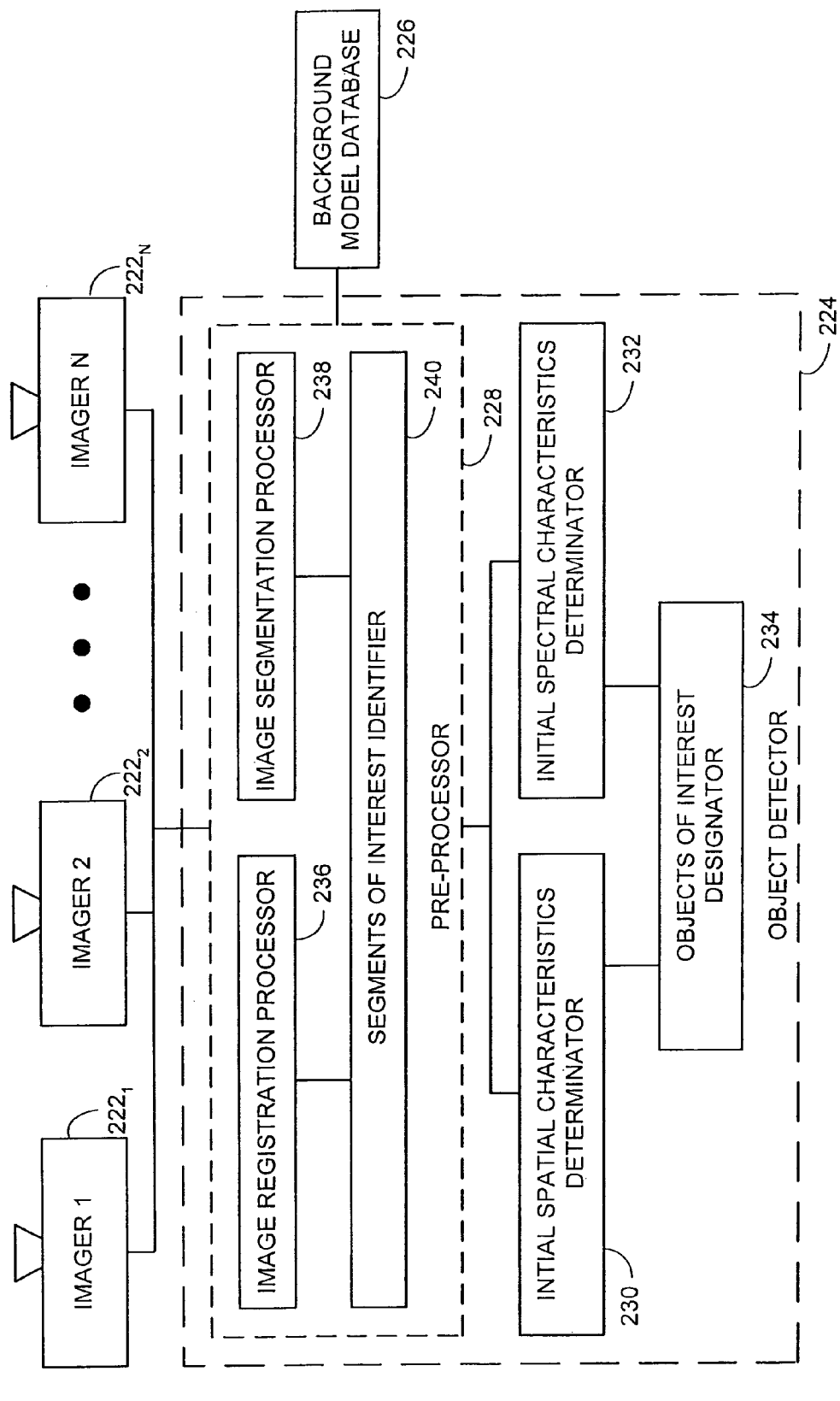
FIG. 3 is a schematic illustration of a system for detecting objects of interest in an observed scene, constructed and operative in accordance with a further embodiment of the disclosed technique.

As mentioned above, the object detector detects objects of interest in the scene. Reference is now made to FIG. 3, which is a schematic illustration of a system, generally reference 220, for detecting objects of interest in an observed scene, constructed and operative in accordance with a further embodiment of the disclosed technique. System 220 includes a plurality of imagers $222_1$, $222_2$ ... $222_N$, an object detector 224 and a background model database 226. Object detector 224 includes a pre-processor 228, an initial spatial characteristics determinator 230, an initial spectral characteristics determinator 232 and an objects of interest designator 234. At least one of imagers $222_1$, $222_2$ ... $222_N$ is a multi-spectral imager and the remaining ones of imagers $222_1$, $222_2$ ... $222_N$ are visual imagers. Pre-processor 228 includes an image registration processor 236, an image segmentation processor 238 and a segments of interest identifier 240. Object detector 224 corresponds to object detector 106 of FIG. 1.

Pre-processor 228 is coupled with imagers $222_1$, $222_2$ ... $222_N$, with initial spatial characteristics determinator 230, with initial spectral characteristics determinator 232 and with background model database 226. Objects of interest designator 234 is coupled with initial spatial characteristics determinator 230 and with initial spectral characteristics determinator 232. Segments of interest identifier 240 is coupled with image registration processor 236 and with image segmentation processor 238.

Each one of imagers $222_1$, $222_2$ ... $222_N$ is located at a different position in a coordinate system associated with the scene (not shown).

Furthermore, each one of imagers $222_1$, $222_2$ ... $222_N$ is associated with respective imager characterizing parameters. Each one of imagers $222_1$, $222_2$ ... $222_N$ acquires a detection sequence of images of the scene (i.e., each sequence is acquired from a different viewing angle of the scene). This detection sequence includes at least one image. Thus, each image in these detection sequences is associated with a respective image attributes. As mention above, at least one imager may be used. This single imager sequentially moves between different known acquisition positions. Each one of imagers $222_1$, $222_2$ ... $222_N$ provides the acquired images thereby to pre-processor 228 with the respective image attributes associated with each image. In pre-processor 228, image segmentation processor 238 segments the acquired images (e.g., using a multi-scale segmentation technique). Image segmentation includes partitioning each image into multiple sets of neigbouring pixels, each set exhibitign at least one common feature (e.g., brightness or color). Each segment is lo associated with at least a portion of an object (e.g., house 118 or car 126 in FIG. 1A) in the scene. In other words, there can be more than one segment corresponding to the same object. Furthermore, image registration processor 236 registers the acquired images (i.e., the images acquired from different positions in the scene). Registering the acquired images includes determining a mapping of each location in one image (i.e., in a coordinate system associated with that image) to a corresponding location in each of the other images (i.e., in a coordinate systems associated with these other images). Image registration processor 236 registers the images acquired by from different positions in the scene, for example, according to the positional relationship between the imagers. According to another example, image registration processor 236 registers images (i.e., either acquired by different imagers or acquired by the same imager) by identifying similar segments, with respect to shape, and determines the corresponding translation, rotation and scaling parameters between these segments. Image registration processor 236 may further determine a mapping between the locations in each image in a background model of the scene. Furthermore, pre-processor 228 may stabilize the acquired images (i.e., reduce distracting vibrations of the imagers for example using a stabilization filter by tracking the movement of pixels) and filter the acquired images using known image filters (e.g., Weiner filter, Guassian filter), prior to segmenting.

Segments of interest identifier 240 identifies segments, which exhibit significant and coherent changes relative to a background model of the scene as segments of interest. For example, segments of interest identifier 240 identifies segments which appear in an image acquired by one imager (i.e., which is associated with respective image attributes), but do not appear in a background image exhibiting similar image attributes (i.e., excluding at least the time stamp), as segments of interest. Furthermore, segments of interest identifier 240 identifies segments of interest in the different images, exhibiting different respective image attributes (e.g., different relative position from which the image was acquired), as corresponding to the same object or a portion of an object in the scene. For example, referring back to FIGS. 1A, 1B, 1C and 1D, segments of interest identifier 240 identifies the segments 160, 180 and 200 as segments of interest corresponding to the same object (i.e., car 126) in scene 116. Segments of interest in different images are determined as corresponding to the same object in scene 116 according to the imager characterizing parameters of the image and the background model. For example, when an object is a ground based object (i.e., not airborne) the location in an image of one segment, defines the azimuth and elevation of the object from the imager. This azimuth and elevation, define the location of the object in coordinate system 134 associated with scene 116 (i.e., since the location of the imagers in reference coordinate 134 is also known). When the azimuth and elevation defined by the location, in another image, of a second segment, define a location in coordinate system 134, substantially similar to the location defined by the one segment, then, these two segments are determined to correspond to the same object in the scene. Alternatively, pre-processor 228 reconstructs a 3D model of the scene from the acquired image, segments this 3D model and determines segments of interest according to the differences between the segmented reconstructed model and the background model. According to yet another alternative, the 3D model is a plurality of panoramic images of the scene each acquired by different imagers. In general, segments of interest identifier 240 attempts to identify segments, which exhibit significant and coherent changes relative to the background model.

Pre-processor 228 provides the registered and segmented images and the identified segments of interest to initial spatial characteristics determinator 230 and to initial spectral characteristics determinator 232. Initial spatial characteristics determinator 230 determines initial spatial characteristics of the identified objects corresponding to the segments of interest, according to the detection sequences of images and the respective image attributes thereof. The initial spatial characteristics include, for each segment of interest and corresponding object thereof (i.e., or a portion of the object corresponding to the segment), respective initial segment spatial characteristics and initial object spatial characteristics. These initial segment spatial characteristics include the intra-image size of the segment (e.g., number of pixels, pixel height, pixel width), the location of the segment in the image (i.e., intra-image location). The initial segment spatial characteristics may further include the trajectory of the segment between images in the detection sequence (i.e., intra-image trajectory). The initial object spatial characteristics include the 3D information of to the objects corresponding to the segments of interest. This 3D information includes size (e.g., actual height and width in units of length, such as meters or feet) and the trajectory of the objects corresponding to the segments of interest, in a reference coordinate system associated with the scene (e.g., reference coordinate system 134 in FIG. 1). Spatial characteristics determinator 230 may further determine additional initial object spatial characteristics according to the trajectory (e.g., velocity, acceleration and the degree of curvature of the trajectory). This 3D information is determined according to images acquired from two different locations. The initial object spatial characteristics may further include the rigidity of the objects (i.e., the changes in the shape of the objects over time) corresponding to the segments of interest.

Initial spectral characteristics determinator 232 determines the initial spectral characteristics of the identified segments of interest and the corresponding objects thereto according to the detection sequences of images and the respective image attributes thereof. These initial spectral characteristics are the segment initial spectral signature and the object initial spectral signature (i.e., or the portion of the object corresponding to the segment). The spectral signature includes the spatial and temporal distribution of the reflectance values (i.e., determined according to the brightness or color values the pixels composing the segments) of the object at different wavelengths (i.e., corresponding to the wavelengths of the imagers—multi-spectral or visual). For example, hair appears as black, blond or brown in the visible spectral band (i.e., according to the color of the hair) but all hair appears bright in the SWIR band. Similarly, in the SWIR range all kind of skins appear dark. Spectral characteristics determinator 232 may further determine additional spectral features such as temperature or heat capacity, according to the spectral signature. For example, metallic objects are hot during sunrise but cool down relatively fast (i.e., relative to other materials) during sunset. This may be used in determining the heat capacity of the object. The heat capacity is related to the material characteristics of the object. Initial spatial characteristics determinator 230 and Initial spectral characteristics determinator 232 provides the segments of interest and the corresponding initial spatial and spectral characteristics thereof to objects of interest designator 234.

Objects of interest designator 234 identifies objects in the scene according to the initial spatial and spectral characteristics respective of the segments of interest and the objects corresponding thereto (i.e., recall there may be more then one segment associated with each object either in the same image or in different images). Objects of interest designator 234 identifies objects, which appear in the scene but do not appear in the background model as objects in the scene. Objects of interest designator 234 identifies objects, corresponding to segments of interest, which exhibit a 3D trajectory which is substantially different from the 3D trajectory of background objects (i.e., objects which appear in the background model) or from the 3D terrain model, as objects in the scene. Additionally, objects of interest designator 234 identifies that a group of segments and objects correspond to the same object in the scene. To that end, objects of interest designator 234, identifies objects exhibiting substantially the same 3D trajectory (i.e., defined by the locations in the scene of the object corresponding to the segment of interest) determined according to a sequences of images acquired by different imagers. Objects of interest designator 234 may further identify a group of segments exhibiting substantially the same trajectory within a detection sequence of images acquired by the same imager (i.e., intra-image trajectory). According to the 3D trajectories of the objects and the intra-image trajectories of the group of segments corresponding to these objects, objects of interest designator 234 may determine that this group of segments and the objects corresponding thereto, all correspond to the same object in the scene. For example, referring back to FIG. 1, objects of interest designator 234 identifies the segment corresponding to person 128 and the segment corresponding to suitcase 130 as exhibiting substantially the same trajectory. Thus, object of interest designator 234 determines that these two segments correspond to the same object in the scene. Objects of interest designator 234, further designates objects in the scene according to the initial spectral characteristics of the segments. For example, objects of interest designator 234 identifies objects, with corresponding segments which appear in at least a selected portion of the spectral bands associated with the acquired images, as objects in the scene.

Objects of interest designator 234, further selects objects of interest from the identified objects in the scene. Objects of interest designator 234 selects these objects of interest according to the initial spectral and spatial characteristics associated with each identified object. For example, objects of interest designator 234 selects objects of interest according to the location of the identified objects in the scene (e.g., when the object is located in a region of interest in the scene). For example, and also referring back to FIG. 1, objects of interest designator 234 may determine that car 126 is located in a region of interest in scene 116 (i.e., the location coordinates of car 126 in reference coordinate system 134 corresponds to a region of interest in scene 116). Objects of interest designator 234 may select objects of interest according to the actual size, trajectory, velocity (e.g., when the velocity of the object exceeds a threshold), acceleration and rigidity of the identified objects. Objects of interest designator 234 further selects objects of interest according to their initial spectral characteristics. For example, and also referring back to FIG. 1, objects of interest designator 234 selects car 126 according to the temperature of car 126 as determined by an LWIR imager. However, objects of interest designator 234 does not select dog 132 as an object of interest, for example, because the temperature of dog 132 combined with the bright reflectance of its fur in the SWIR range (i.e., relative to the reflectance of the fur in the visible range), renders dog 132 to be of no interest (i.e., since humans are generally not covered with furs and skin absorb radiation at SWIR range, the segment corresponding to a human appear dark). Thus, for example, objects of interest designator 234 selects the objects corresponding to car 126 and person 128 with suitcase 130 as objects of interest. However, the segment corresponding to dog 132 is not designated as an object of interest. In general, object designator 234 identifies segments corresponding to objects in the scene and selects objects of interest according to a combination of the spatial and spectral characteristics of objects in the scene. This combination may be a weighted sum of the characteristics, a neural network or a decision tree of the characteristics. For example, if an object moves fast and the object is rigid, then that object is designated as an object of interest regardless of the spectral signature of this object since the object might be a plane.

Figure 4:
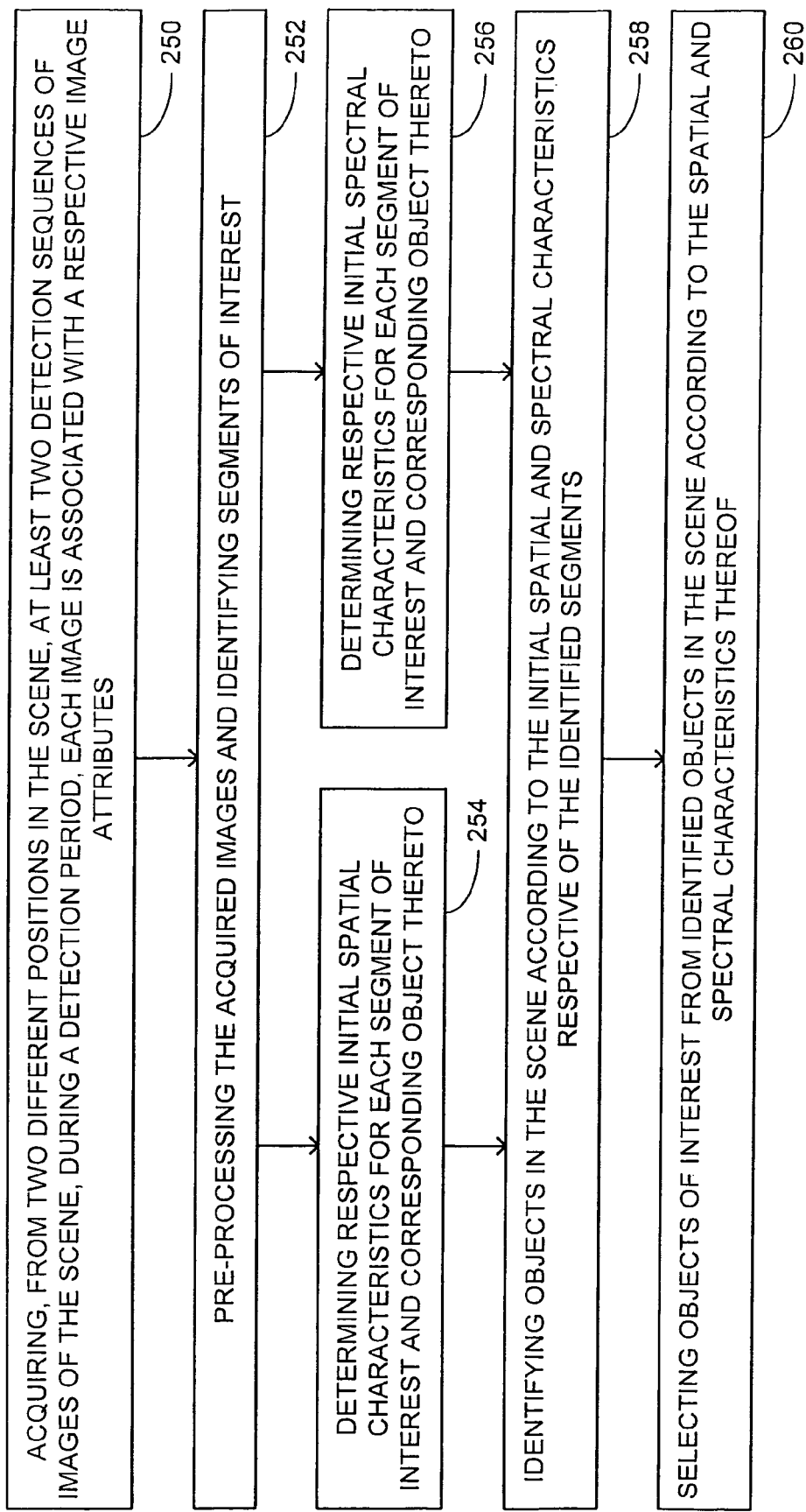
FIG. 4 is a schematic illustration of a method for detecting objects of interest in an observed scene, operative in accordance with another embodiment of the disclosed technique.

Reference is now made to FIG. 4, which is a schematic illustration of a method for detecting objects of interest in an observed scene, operative in accordance with another embodiment of the disclosed technique. In procedure 250, at least two detection sequences of images of the scene are acquired from two different positions in the scene. Each image is associated with respective image attributes. At least one of the images is a multi-spectral image. The two detection sequences may be acquired by a single imager sequentially positioned (i.e., moving) at different location in the scene or by two different imagers. With reference to FIG. 3, each one of imagers $222_1, 222_2 \ldots 222_N$ acquires a detection sequence of images. At least one of imagers $222_1, 222_2 \ldots 222_N$ is a multi-spectral imager, which acquires a multi-spectral image.

In procedure 252, the acquired images are pre-processed. This pre-processing includes image stabilization, image registration and image segmentation. Each segment is associated with at least a portion of a corresponding object in the scene. Pre-processing may further include filtering the acquired images. Furthermore, pre-processing includes identifying segments of interest. Identifying segments of interest includes identifying segments, which exhibit significant and coherent changes relative to a background model of the scene. Pre-processing further includes identifying segments of interest in the different images exhibiting different image attributes, as corresponding to the same object in the scene. With reference to FIG. 3, pre-processor 228 pre-processes the acquired images. After procedure 252, the method proceeds to procedure 254 and 256.

In procedure 254, respective initial spatial characteristics are determined for each identified segment interest and corresponding object there. These initial spatial characteristics are determined according to the detection sequences of images and the respective image attributes thereof. The initial spatial characteristics include, for each segment of interest and corresponding object thereof (i.e., or a portion of the object corresponding to the segment), respective initial segment spatial characteristics and initial object spatial characteristics. These initial segment spatial characteristics include the size of the segment, the location of the segment in the image. The initial object spatial characteristics include the 3D information of to the objects corresponding to the segments of interest. This 3D information includes size and the trajectory objects corresponding to the segments of interest in a reference coordinate system associated with the scene, and features derived there from. The initial object spatial characteristics may further include the rigidity of the objects. With reference to FIG. 3, initial spatial characteristics determinator 230 determines the initial spatial characteristics of the identified segments of interest. After procedure 254, the method proceeds to procedure 258.

In procedure 256, respective initial spectral characteristics are determined for each identified segment of interest and corresponding object there. These initial spectral characteristics are determined according to the detection sequences of images and the respective image attributes thereof. These initial spectral characteristics are the segment initial spectral signature the object initial spectral signature. The spectral signature includes the spatial and temporal distribution of the reflectance values of the object at different wavelengths. With reference to FIG. 3, spectral characteristics determinator 232 determines the initial spectral characteristics of the identified segments of interest.

In procedure 258, objects in the scene are identified according to the initial spatial and spectral characteristics respective of the segments of interest. As mentioned above, a group of segments, which appear in at least a selected portion of the spectral bands associated with the acquired images, are identified as object in the scene. Objects, which appear in the scene but do not appear in the background model, are also identified as objects in the scene. Additionally, a group of segments and objects correspond to the same object in the scene are identified. To that end, objects exhibiting substantially the same 3D trajectory are identified. Furthermore, a groups of segments exhibiting substantially the same intra-image trajectory are also identified. According to the 3D trajectories of the objects and the intra-image trajectories of the group of segments corresponding to these objects, these segments and objects are determined as all corresponding to the same object in the scene. Additionally, objects, corresponding to at least one segment, exhibiting a 3D trajectory, which is substantially different from the trajectory of background objects, are also designated as objects in the scene. With reference to FIG. 3, object designator 234 identifies segments of interest, corresponding to objects of interest in the scene.

In procedure 260, objects of interest are selected from the identified objects in the scene according to the initial spatial and spectral characteristics of the identified objects. For example, the objects of interest are selected according to the 3D location (i.e., determined according to images acquired by different imagers), trajectory (i.e., determined according to the locations of the object of interest), velocity (i.e., determined according to the rate of change of the locations the object of interest with respect to time), acceleration (i.e., determined according to the rate of change of the velocity the object of interest with respect to time) and actual (i.e., 3D) size of the each object. With reference to FIG. 3, object designator 234 selects objects of interest from the identified objects in the scene according to the spatial and spectral characteristics of the identified object.

After selecting objects of interest, the at least two tracking sequence of the observed scene are acquired. In general, the tracking sequences are larger than the detection period and include a larger number of images. Similar to the images in the detection sequence, each image in the tracking sequence is associated with respective image attributes. Furthermore, the two tracking sequences may be acquired by a single imager sequentially positioned at different location in the scene or by two different imagers. Referring back to FIG. 1, object tracker 106 tracks the detected objects of interest (e.g., by employing a Kalman filter) according to the tracking sequence of images and the respective image attributes, and determines dynamic spatial and spectral characteristics. In general, the dynamic spatial and spectral characteristics are similar to the initial spectral and spatial characteristics. However, since the tracking sequence is larger than the detection sequence, the data included in the acquired images in the tracking sequence data is substantially larger then the data included in the detection sequence. Thus, the dynamic spatial and spectral characteristics determined by the object tracker are more reliable and accurate (i.e., more closely conforming to the actual values of the characteristics) than the initial spatial and spectral characteristics determined by object detector 104. Furthermore, object tracker 106 may receive information regarding initial classification of the tracked objects from object classifier 108 indicating that the tracked object, for example person 128, is a human. Object tracker 106 receives from database 110 that the expected height and width of a human and thus of person 128. Object tracker determines the expected size of the segment in the image corresponding to person 128 according to the location of person 128 relative to imagers $102_1$, $102_2$ and $102_3$. Thus even if person 128 is partially concealed during the movement of person 128 in the scene, and the segment corresponding to person 128 changes the size and shape thereof, object tracker 106 will continue tracking that segment and thus person 128 (i.e., object tracker will not determine that the segment corresponding to the concealed person is of no interest). Object tracker may confirm objects of interest that appear in the scene but do not appear in the background model of the scene. For example, when two objects that have been moving together (e.g., a man and a suitcase) part, the object tracker may confirm that the new objects (i.e., either man or suitcase or both) do not appear in the background model of the scene. Object tracker 106 may also superimpose a representation of the tracked objects on a 2D or 3D representation of the scene. This representation of the scene along with the superimposed representations of the tracked objects may be displayed on a display (not shown). For example, object tracker 106 may superimpose a representation of the tracked objects on an aerial photograph of the scene (i.e., provided that the aerial photograph is registered with reference coordinate system 134). As a further example, object tracker 106 may superimpose a representation of the tracked objects on a digital terrain map of the scene (i.e., provided that the digital terrain map of the scene is registered with reference coordinate system 134).

Figure 5:
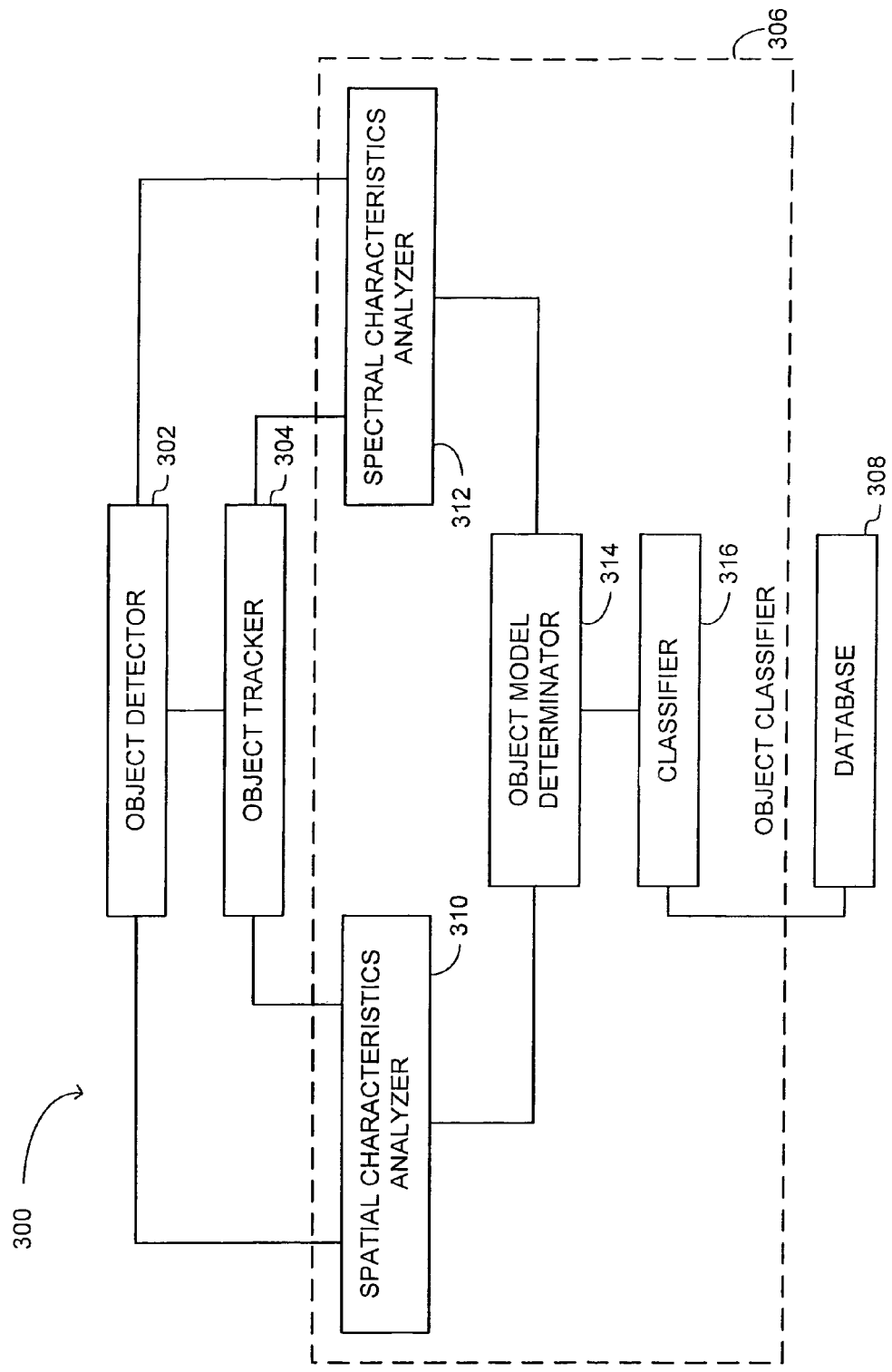
FIG. 5 is a schematic illustration of a system for classifying objects in an observed scene, in accordance with a further embodiment of the disclosed technique.

As mentioned above, the object tracker provides the dynamic spatial and spectral characteristics respective of each tracked object to an object classifier. Reference is now made to FIG. 5, which is a schematic illustration of a system, generally referenced 300, for classifying objects in an observed scene, in accordance with a further embodiment of the disclosed technique. System 300 includes an object detector 302, and object tracker 304, an object classifier 306 and a database 308. Object classifier 306 includes a spatial characteristics analyzer 310, a spectral characteristics analyzer 312, an object model determinator 314 and a classifier 316. Object classifier 306 corresponds to object classifier 108 in FIG. 1.

Spatial characteristics analyzer 310 is coupled with object detector 302, with object tracker 304 and with object model determinator 314. Spectral characteristics analyzer 312 is also coupled with object detector 302, with object tracker 304 and with object model determinator 314. Classifier 316 is coupled with object model determinator 314 and with database 308.

Object detector 302 and object tracker 304 provide spatial characteristics analyzer 310 with the spatial characteristics of the selected objects of interest in the scene (i.e., the initial and dynamic spatial and spectral characteristics respectively). As mention above, these spatial characteristics (i.e., either initial or dynamic) are, for example, the size and trajectories of objects of interest in the scene and in the images. Furthermore, object detector 302 and object tracker 304 provide spectral characteristics analyzer 312 with the spectral characteristics of the selected objects of interest in the scene. As mention above, these spectral characteristics are, for example, the spectral signature of an object in the scene.

Spatial characteristics analyzer 310 analyzes the spatial characteristic associated with the objects of interest. This analysis includes, for example, statistical analysis of the motion of the object of interest (e.g., average velocity, standard deviation of the velocity and the like). Spectral characteristics analyzer 312 analyzes the spectral characteristics associated with the objects of interest. For example, spectral characteristics analyzer 312 determines the spectral signature of the objects of interest in one spectral band relative to the other spectral bands. For example, object made of chlorophyll, such as trees or grass, appear green in the visible range of the spectrum and bright in the NIR range. This analysis includes further includes statistical analysis of the spectral signature of the objects of interest. Spatial characteristics analyzer 310 and spectral characteristics analyzer 312 provide the results of their respective analyses to object model determinator 314.

Object model determinator 314 determines a respective object model for each object of interest. The object model is for example a table of object features determined according to the object spatial and spectral characteristics. These features may include, for example, statistical attributes (e.g., the average velocity, the standard deviation of the velocity), actual size, the spectral signature, the heat capacity, the rigidity of the object and the like. Classifier 316 classifies objects (e.g., person with suitcase 130, car 126 in FIG. 1) according to the respective object models associated with the objects of interest and object models of known objects stored in database 308 employing, for example, a signature table or a discriminative classification method. Object classifier 314 may use, similar to as mentioned above, a known classification technique such as a decision tree, a neural network, a genetic algorithm, k-nearest neighbor or any combination thereof. The result of the classification may be deterministic or fuzzy (i.e., a classification with a degree of confidence). The object models of known objects stored in database 308 may also include object models of known background objects (e.g., lake 124 in FIG. 1). Furthermore, classifier 316 updates the stored object models in database 308. The object models of the known objects, stored in database 308, can be determined by acquiring image of these known objects and determining the features in the object models according to these images (i.e., acquitting a training set of images). It is noted that more than one object model may be stored for each object (e.g., twenty object models of a dog, or hundred object models of a car etc). Alternatively, the object models may be heuristically determined.

Following is a classification example. Initially, the features of the known object models are projected on a feature space. This feature space includes a dimension for each feature (e.g., temperature, brightness, velocity, size). The projections of the known object models on the feature space are clustered, thereby defining an object cluster. Thus, each object cluster is associated with a known object. The center of mass (i.e., the average weighted position of object model in the feature space) and the cluster boundaries are determined for each object cluster. For, each new object, the projection of the object features on the feature space is determined (i.e., a respective point in the feature space). The new object is classified according to the distance (e.g., Euclidian distance) of the respective point, relative to the center of mass of the object cluster. When the point is within the boundaries of an object cluster, then, the object corresponding to that point is classified as that object corresponding to the object cluster.

Figure 6:
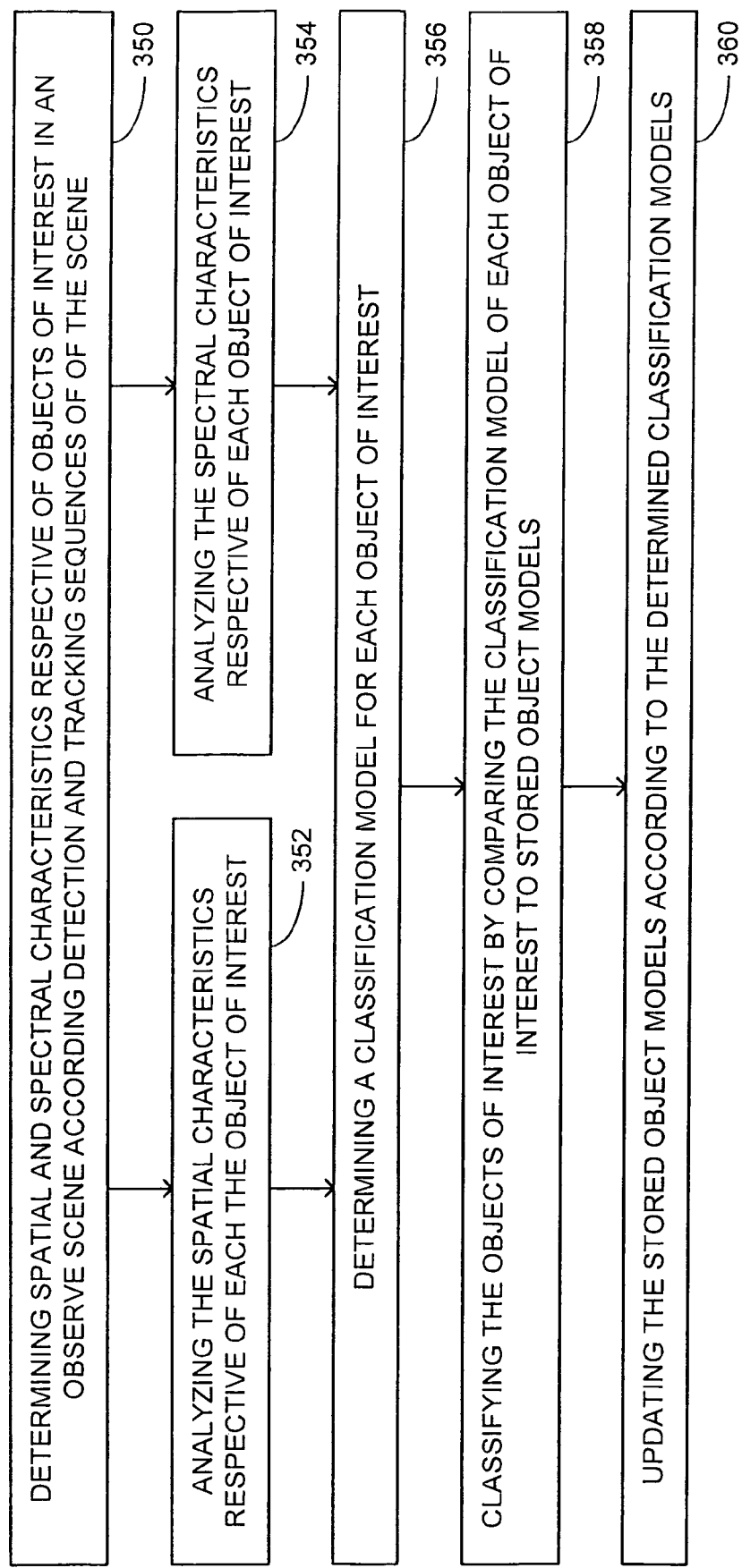
FIG. 6 is a schematic illustration of a method for classifying objects of interest in an observed scene, operative in accordance with another embodiment of the disclosed technique.

Reference is now made to FIG. 6, which is a schematic illustration of a method for classifying objects of interest in an observed scene, operative in accordance with another embodiment of the disclosed technique. In procedure 350, spatial and spectral characteristics respective of objects of interest in an observed scene are determined according to detection and tracking sequences of images of the scene. As mention above, these spatial characteristics are, for example, the size and trajectories of objects of interest in the scene and in the images. The spectral characteristics are, for example, the spectral signature of an object in the scene and changes thereof. With reference to FIG. 5, object detector 302 and object tracker 304 determine spatial and spectral characteristics of objects of interest. After procedure 350, the method proceeds to procedures 352 and 354.

In procedure 352, the spatial characteristics respective of each object of interest are analyzed. This analysis includes, for example, a statistical analysis of the motion of the object of interest. This analysis may further determine the degree of curvature of the trajectory of the object. With reference to FIG. 5, spatial characteristics analyzer 310 analyzes the spatial characteristics of the objects on interest. After procedure 352, the method proceeds to procedures 356.

In procedure 354, the spectral characteristics respective of each object of interest are analyzed. This analysis includes, for example, statistical analysis of the spectral signature of the objects of interest during the tracking period. The spectral characteristics analysis may determine the spectral signature of the objects of interest in one spectral band relative to the other spectral bands. With reference to FIG. 5, spectral characteristics analyzer 312 analyzes the spectral characteristics of the objects on interest.

In procedure 356, an object model is determined for each object of interest. The object model is for example a table of object features determined according to the spatial and spectral characteristics of the object. These features may include, for example, statistical attributes (e.g., the average velocity, the standard deviation of the velocity), the actual size of the object, the spectral signature, the heat capacity, the rigidity of the object and the like. With reference to FIG. 5, object model determinator 314 determines an object model for each object of interest.

In procedure 358, the objects of interest are classified by according to the object models of the objects of interest and stored object models. The objects of interest are classified by employing, for example, a signature table or a discriminative classification method. The objects are classified according to a decision tree, a neural network, a genetic algorithm, k-nearest neighbor or any combination thereof. The result of the classification may be deterministic or fuzzy. With reference to FIG. 5, classifier 316 classifies the objects of interest in the scene by comparing the determined object models to object models stored in database 308.

In procedure 360, the stored object models are updated according to the determined object models. With reference to FIG. 5, classifier 316 updates the object models stored in database 308 according to the determined object models.

As mentioned above, prior to object tracking and classification, an automatic background model is determined. The background model is used for identifying objects in the scene. This background model may be, for example, an aerial photograph of the scene. The background model may further be a Digital Terrain Map (DTM) of the scene. Alternatively, a background model determinator determines the background model. Referring back to FIG. 1A, Background model determinator 112 determines the background model of scene 116. Accordingly, imagers $102_1$, $102_2$ and $102_3$ acquire a background detection sequence. Each background detection sequence may be a portion of a background determination sequence. Each one of imagers $102_1$, $102_2$ and $102_3$ provides the respective acquired background detection sequence of images, and the image attributes associated with each image to object detector 104.

Initially object detector 104 pre-process the acquired images (i.e., as mentioned above includes image registration and segmentation). Object detector 104 identifies segments in the same image as corresponding to the same object. Furthermore, object detector 104 identifies segments in different images, acquired by different imagers, as corresponding to the same object in the scene. After the pre-processing, object detector 104 determines respective initial spatial characteristic and initial spectral characteristics for each segment according to the respective image attributes. Thus, the initial spatial and spectral characteristics respective of each segment are also associated with the object corresponding to that segment. Object detector 104 identifies background objects in scene 116 according to the initial spatial and spectral characteristics corresponding to the segments. Object detector 104 provides the segments corresponding to the background objects in the scene to object tracker 106. Additionally, object detector 104 provides the segments corresponding to the background objects and the respective segment spatial and spectral characteristics thereof to object classifier 108. Object classifier 108 performs initial classification the background objects according to the spatial and spectral characteristics (e.g., a building, a body of water).

Each one of imagers $102_1$, $102_2$ and $102_3$ further acquires a background tracking sequence of images of scene 116 during a background tracking period. This, background tracking sequence may be a portion of the background determination sequence (i.e., the background detection sequence portion and the background tracking sequence portion in the background detection sequence may be mutually exclusive or at least partially overlap). Each image in the background tracking sequences is also associated with respective image attributes. Similar to the images in the background detection sequences, each of the images acquired by the same imager may be associated with different image attributes. Each one of imagers $102_1$, $102_2$ and $102_3$ provides the respective acquired background tracking sequence of images to object tracker 106 with the respective image attributes associated with each image.

Object tracker 106 tracks the detected background objects in scene 116 and determines dynamic spatial and spectral characteristics for each background object. These dynamic spatial and spectral characteristics are determined from the images in the tracking sequence. Similar to as described above, object tracker 106 may receive information from object classifier 108 while tracking the selected objects, thus enhancing the tracking capabilities thereof. Object tracker 106 provides these dynamic spatial and spectral characteristics respective of each tracked object, to object classifier 108. Object classifier 108 performs a refined classification of the background object in scene 116 (e.g., the building is a house, the body of water is a lake). For each background object, object classifier 108 determines an object model respective thereof according to the dynamic spatial and spectral characteristics associated with each background object. Object classifier 108 classifies each background object according to the respective object model thereof.

Background model determinator 112, determines a background model of scene 116 according to the detected background objects in the scene and the dynamic spatial and spectral characteristics thereof. Furthermore, background model determinator 112 may use a terrain model provided by geographical information system (GIS) 410. For example, background model determinator 112 may associate between objects detected by the object detector and objects in the GIS terrain model. Background model determinator 112 may further determine the location of detected objects on the GIS terrain model. Thus, background model determinator 112 may refine the GIS terrain model (e.g., increase the spatial 3D resolution of the GIS terrain model or add objects thereto). Furthermore, background model determinator 112 may use the trajectory of an object moving on the ground (i.e., during the background model determination) to refine the GIS terrain model to agree with the trajectory of this moving object.

Figure 7:
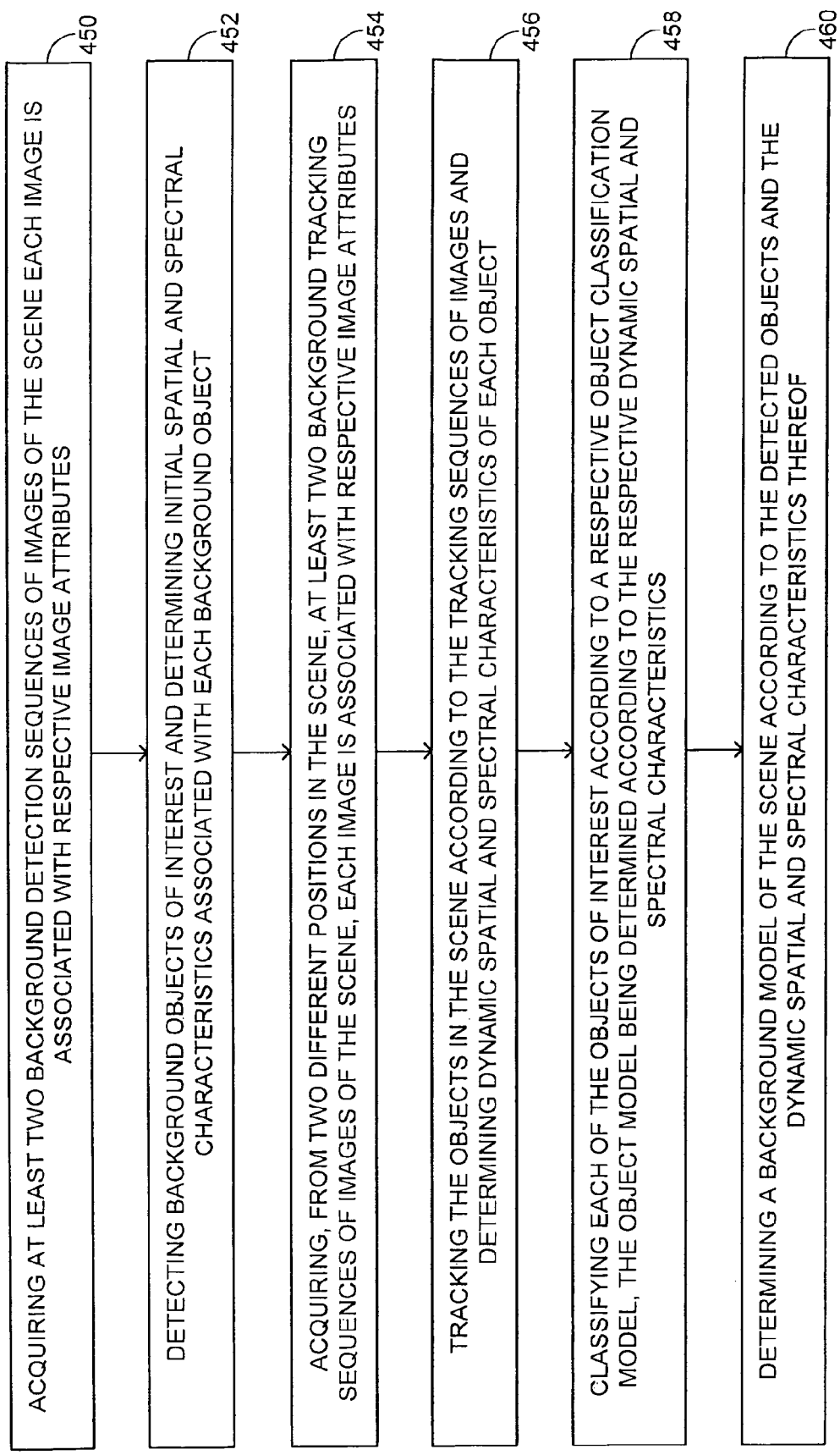
FIG. 7 is a schematic illustration of a method for determining a background model of an observed scene, operative in accordance with a further embodiment of the disclosed technique.

Reference is now made to FIG. 7, which is a schematic illustration of a method for determining a background model of an observed scene, operative in accordance with a further embodiment of the disclosed technique. In procedure 450, at least two background detection sequences of images of the scene are acquired during a background detection period. At least one image in one of the detection sequence is a multi-spectral image. Each image in the sequences is associated with respective image attributes. The two detection sequences may be acquired by a single imager sequentially positioned at different location in the scene or by different imagers located at different positions in the scene. With reference to FIG. 1, each one of imagers $102_1$, $102_2$ and $102_3$ acquires a detection sequence of images.

In procedure 452, background objects are detected and initial spatial and spectral characteristics associated with each background object are determined. Object characteristics include initial spatial and spectral characteristics. Initially, the acquired images are pre-processed. This pre-processing includes image stabilization, image registration and image segmentation. The pre-processing may further include filtering the images. The respective initial spatial characteristic and initial spectral characteristics are determined for each segment and corresponding object thereto according to the respective image attributes. Thereafter, objects in the scene are identified. With reference to FIG. 1, object detector 106 detects objects in the scene.

In procedure 454, at least two background tracking sequences of images of the scene are acquired from two different positions in the scene, during a tracking period. At least one of the images in the tracking sequence is a multi-spectral image. Each image in the tracking sequence is associated with a respective image attributes. The two tracking sequences may be acquired by a single imager sequentially positioned at different location in the scene or by different imagers located at different positions in the scene. With reference to FIG. 1, each one of imagers $102_1$, $102_2$ and $102_3$ acquires a background tracking sequence of images.

In procedure 456, the background objects in the scene are tracked according to tracking sequences of images. Furthermore, dynamic spatial and spectral characteristics, associated with each object are determined. These dynamic spatial and spectral characteristics are determined according to the image attributes associated with each image. These dynamic object characteristics include spatial and spectral object characteristics (e.g., trajectory of the object in a 3D reference coordinate system and the spectral signature of the object). With reference to FIG. 1, object tracker 106 tracks background objects in the scene according to the sequences of images and determines dynamic object characteristics.

In procedure 458, the objects are classified according to respective object models thereof. An object model, respective of each background object, is determined. This object model is determined according to the dynamic spatial and spectral characteristics associated with each background object. The object model is for example a table of object features determined according to the object characteristics. The background objects are classified by comparing the respective object models thereof with stored object models of known objects. With reference to FIG. 1, object classifier 110 classifies the background objects.

In procedure 460, a background model of the scene is determined according to the detected objects and the dynamic spatial and spectral characteristics thereof. With reference to FIG. 1, background model deteminator 112 determines a background model of scene 116.

It will be appreciated by persons skilled in the art that the disclosed technique is not limited to what has been particularly shown and described hereinabove. Rather the scope of the disclosed technique is defined only by the claims, which follow.

The invention claimed is:

1. Multi-view multi-spectral detection and tracking system comprising:
    at least one imager, at least one of said at least one imager being a multi-spectral imager, said multi-spectral imager acquiring images in a plurality of spectral bands, at least one of said spectral bands extending beyond the visible spectral band, said at least one imager acquiring at least two detection sequences, and at least two tracking sequences, each sequence including at least one image, each acquired image being associated with respective image attributes;

an object detector, coupled with said at least one imager, detecting objects of interest in said scene, according to said detection sequence of images and said respective image attributes;

an object tracker coupled with said object detector, said object tracker tracking said objects of interest in said scene and determining dynamic spatial characteristics and dynamic spectral characteristics for each object of interest according to said tracking sequences of images and said respective image attributes, said image attributes including at least the spectrum of the image;

an object classifier, coupled with said object tracker, classifying said objects of interest according to said dynamic spatial characteristics and said dynamic spectral characteristics; and wherein said object detector comprises a pre-processor couples with a database, said pre-processor at least including;

an image registration processor, registering the images acquired from different positions in said scene;

an image segmentation processor, segmenting the acquired images into segments, each segment is associated with at least a portion of an object in said scene; and a segments of interest identifier, couples with said image registration processor and with said image segmentation processor, said segments of interest identifier identifies segments of interest in the scene according to the segmented images and a background model of said scene.

2. The system according to claim 1, wherein said image attributes further include at least one of the group consisting of:
   a respective time stamp; and
   respective imager characterizing parameters corresponding to the imager that acquired the image.

3. The system according to claim 2, wherein said imager characterizing parameters are selected from the group consisting of:
   the Pan;
   the Tilt;
   the Zoom; and
   the relative position of the imager.

4. The system according to claim 2, wherein said spectral band is selected from the group consisting of:
   visible;
   Near InfraRed;
   Short Wave InfraRed;
   Long Wave InfraRed;
   Mid wave infrared;
   Ultraviolet; and
   Millimeter wave.

5. The system according to claim 1, wherein said system includes at least two imagers, at least one of said at least two imagers being a multi-spectral imager.

6. The system according to claim 1, wherein said object detector further comprises:
   an initial spatial characteristics determinator, coupled with said pre-processor, determining initial spatial characteristics of objects corresponding to said segments of interest, according to said detection sequences of images and the respective image attributes thereof;

an initial spectral characteristics determinator, coupled with said pre-processor determining initial spectral characteristics of the objects corresponding to said segments of interest according to said detection sequences of images and the respective image attributes thereof; and object of interest designator, coupled with said spatial characteristics determinator and said with spectral characteristics determinator, said object of interest designator identifying objects in the scene corresponding to said segments of interest, and selecting objects of interest from said objects in the scene according to said initial spatial characteristics and said initial spectral characteristics of said segments of interest, wherein said initial spectral characteristics include the spectral signature of said objects corresponding to the segments of interest, wherein said initial spatial characteristics at least includes 3D information related to the objects corresponding to the segments of interest, wherein said 3D information includes the size of said objects corresponding to said segments of interest, the trajectory of said objects corresponding to said segments of interest in a reference coordinate system associated with said scene.

7. The system according to claim 6, wherein said pre-processor further filters and stabilizes the acquired images.

8. The system according to claim 6, wherein said segments of interest identifier identifies segments, which appear in an image acquired from one position but do not appear in a background image which exhibits similar image attributes, as segments of interest; and
   wherein said segments of interest identifier identifies segments of interest in different images, exhibiting different respective image attributes, as corresponding to at least a portion of the same object in said scene.

9. The system according to claim 6, wherein said object of interest designator identifies an object in said scene according to at least one of the following criteria:
   an object, corresponding to at least one segment of interest, which exhibit a 3D trajectory which is substantially different than the 3D trajectory of background objects, is identified as an object in said scene
   objects, corresponding to a group of segments of interest, said objects exhibiting substantially the same 3D trajectory, are identified as a single object is said scene;
   a group of segments of interest exhibiting substantially the same intra-image trajectory are identified as a single object in said scene; and
   a segment of interest which appear in at least a selected portion of the spectral bands associated with the acquired images, as objects of in the scene.

10. The system according to claim 6, where said 3D information is may further include the rigidity of said objects corresponding to said segments of interest.

11. The system according to claim 6, wherein said initial spatial characteristics further include the intra-image size, intra-image location and the intra-image trajectory of the segments of interest.

12. The system according to claim 6, wherein said initial spectral characteristics further include the temperature and the heat capacity of said objects corresponding to the segments of interest.

13. The system according to claim 1, wherein said dynamic spatial characteristics include the size, the rigidity and the trajectory of the selected objects in the scene determined according to a tracking sequence, wherein said dynamic spectral characteristics include the spectral signature of the object determined according to said tracking sequence, and wherein said tracking sequence is a portion of a tracking and classification sequence.

14. The system according to claim 1, wherein said object tracker superimposes a representation of the tracked objects on a representation of the scene.

15. The system according to claim 1, wherein said classifier comprises:
   a dynamic spatial characteristics analyzer analyzing said dynamic spatial characteristic associated with the objects of interest;
   a dynamic spectral characteristics analyzer analyzing said dynamic spectral characteristic associated with the objects of interest;
   an object model determinator, coupled with said dynamic spatial characteristics analyzer and with said dynamic spectral characteristics analyzer, determining an object model for each object of interest; and
   a classifier, coupled with said object model and with a database classifying said object according to the respective object models associated with the objects of interest and object models of known objects stored in a database.

16. The system according to claim 15, wherein said dynamic spatial characteristics analyzer statistically analyzes the motion of the object of interest.

17. The system according to claim 15, wherein said dynamic spectral characteristics analyzer performs at least one of following:
   determines the spectral signature of the objects of interest in one spectral band relative to the spectral signature in other spectral bands;
   statistical analysis of the spectral signature of the objects of interest during the tracking period.

18. The system according to claim 15, wherein said object model is a table of object features, and
   wherein said features at least include the trajectory and the spectral signature.

19. The system according to claim 18, wherein said features are further selected from the group consisting of:
   average velocity;
   standard deviation of the velocity;
   size; and
   rigidity.

20. The system according to claim 15, wherein said object classifier is further coupled with said object detector and performs initial classification of said objects of interest the according to the initial spatial and spectral characteristics and provides said initial classification to said object tracker.

21. The system according to claim 15, wherein said object classifier updates the stored object models according to the determined object models.

22. The system according to claim 1, further comprising a background model determinator, said background model determinator determines a background model of said scene by identifying background objects in said scene and determined the respective spatial and spectral characteristics of said background objects according to a background determination sequence of images,
   wherein said background model determinator is further coupled with a database.

23. The system according to claim 22, further comprising a geographical information system, providing a terrain model of said scene, said background model determinator associating between background objects and said terrain model, and wherein said object model determinator refines said terrain model according to trajectory of an object moving on the ground.

24. A multi-view multi-spectral detection and tracking method comprising the procedures of:
   acquiring at least two detection sequences of images of the scene, each sequence including at least one image, each image being associated with respective image attributes, at least a portion of said images being acquired in a plurality of spectral bands, at least one of said spectral bands extending beyond the visible spectral band;
   detecting objects of interest from objects in the scene and determining initial object characteristics according to said detection sequence of images and said respective image attributes;
   acquiring at least two tracking sequences of images of the scene, each sequence including at least one image, each image being associated with respective image attributes;
   tracking the objects of interest in the scene according to the sequences of images and determining dynamic spatial and spectral characteristics of each said objects of interest according to tracking sequences of images and said respective image attributes, said image attributes including at least the spectrum of the image,
   wherein said objects in said scene are identified according to at least one of the following criteria;
   an object, corresponding to at least one segment of interest, which exhibit a 3D trajectory which is substantially different that the 3D trajectory of background objects, is identified as an object in said scene; and
   objects, corresponding to a group of segments of interest, said objects exhibiting substantially to same 3D trajectory, are identified as a single object in said scene; and
   classifying each of the objects of interest according to a respective object classification model respective of said each object of interest.

25. The method according to claim 24, wherein said image attributes further include at least one of the group consisting of:
   a respective time stamp; and
   respective imager characterizing parameters corresponding to the imager that acquired the image.

26. The method according to claim 25, wherein said imager characterizing parameters are selected from the group consisting of:
   the Pan;
   the Tilt;
   the Zoom; and
   the relative position of the imager.

27. The method according to claim 25, wherein said spectral band is selected from the group consisting of:
   visible;
   Near InfraRed;
   Short Wave InfraRed;
   Long Wave InfraRed;
   Mid wave infrared;
   Ultraviolet; and
   Millimeter wave.

28. The method according to claim 24, wherein said procedure of detecting objects of interest includes the sub-procedures of:
   pre-processing the acquired images and identifying segments of interest;
   determining initial spatial characteristics of the segments of interest;
   determining initial spectral characteristics of the segments of interest;

identifying said objects in the scene according to the spatial and spectral characteristics of the identified segments; and selecting objects of interest from identified objects in the scene according to the spatial and spectral characteristics thereof.

29. The method according to claim 28, wherein said procedure of pre-processing at least includes registering and segmenting the acquired images, wherein said procedure of pre-processing further includes filtering and stabilizing said acquired images, wherein said procedure of pre-processing includes identifying segments of interest according to segments which appear in an image acquired from one position in but do not appear in a background image which exhibits similar image attributes, and wherein said segments of interest in different images, exhibiting different respective image attributes, are identified as corresponding to at least a portion of the same object in said scene.

30. The method according to claim 29, wherein said objects in said scene are alternatively identified according to at least one of the following criteria:

a group of segments of interest exhibiting substantially the same intra-image trajectory are identified as a single object in said scene; and a segment of interest which appear in at least a selected portion of the spectral bands associated with the acquired images, as objects of in the scene.

31. The method according to claim 28, wherein said initial spatial characteristics at least includes 3D information related to the objects corresponding to the segments of interest, and wherein said 3D information includes the size of said objects corresponding to said segments of interest and trajectory of said objects corresponding to said segments of interest in a reference coordinate system associated with said scene.

32. The method according to claim 28, wherein said initial spatial characteristics include the spectral signature of said objects corresponding to the segments of interest.

33. The method according to claim 32, wherein said initial spectral characteristics further the temperature and the heat capacity of said objects corresponding to the segments of interest.

34. The method according to claim 24, wherein said 3D information is may further include the rigidity of said objects corresponding to said segments of interest.

35. The method according to claim 24, wherein said initial spatial characteristics further include the intra-image size, intra-image location and intra-image trajectory of the segments of interest.

36. The method according to claim 24, wherein said detection sequence is a portion of a tracking and classification sequence.

37. The method according to claim 24, wherein said dynamic spatial characteristics include the size, the rigidity and the trajectory of the selected objects in the scene determined according to a tracking sequence, wherein said dynamic spectral characteristics include the spectral signature of the object determined according to said tracking sequence, and wherein said tracking sequence is a portion of a tracking and classification sequence.

38. The method according to claim 24, wherein a representation of the tracked objects is superimposed on a representation of the scene.

39. The method according to claim 24, wherein said procedure of classifying said objects of interest includes the sub-procedures of:

analyzing the dynamic spatial characteristics of the objects of interest;

analyzing the dynamic spectral characteristics of the objects of interest;

determining a classification model for each object of interest; and classifying the objects of interest by comparing the classification model of each object of interest to stored object models.

40. The method according to claim 39, further includes the sub-procedure of updating the stored object models according to the determined object models.

41. The method according to claim 39, wherein said analyzing said dynamic spatial characteristics includes statistically analyzing the motion of the object of interest.

42. The method according to claim 39, wherein analyzing said dynamic spectral characteristics includes performing any combination of following:

determining the spectral signature of the objects of interest in one spectral band relative to the other spectral bands;

statistically analyzing of the spectral signature of the objects of interest during the tracking period;

spatially analyzing of the spectral signature of the object; and temporally analyzing the dynamic spectral characteristics.

43. The method according to claim 39, wherein said object model is a table of object features.

44. The method according to claim 43, wherein said features at least include the following:

average velocity;

standard deviation of the velocity;

size;

rigidity;

spectral signature; and heat capacity.

45. The method according to claim 39, wherein said object classifier updates the stored object models according to the determined object models.

46. The method according to claim 24, further including the procedure of initially classifying said object of interest according to the initial spatial characteristics and said initial spectral characteristics prior to said procedure of tracking said objects of interest.

47. The method according to claim 24, further including the preliminary procedure of determining a background model of said scene.

48. The method according to claim 47, wherein said preliminary procedure of determining a background model of said scene includes the sub-procedures of:

acquiring at least two background detection sequences of images of the scene each image is associated with respective image attributes;

detecting background objects in the scene and determining initial object characteristics;

acquiring at least two background tracking sequences of images of the scene, each image is associated with respective image attributes;

tracking the objects in the scene according to the background tracking sequences of images and determining dynamic spatial and spectral characteristics of each object;

classifying each of the objects of interest according to a respective object classification model, the object model being determined according to the respective dynamic spatial and spectral characteristics; and determining a background model of the scene according to the detected objects and the dynamic spatial and spectral characteristics thereof.

49. The method according to claim 48, wherein said object model includes a table of object features determined according to the background object spatial and spatial characteristics.

50. The method according to claim 48, wherein said determining a background model of said scene further includes associating between background objects and a terrain model, and wherein said terrain model is refined according to trajectory of an object moving on the ground.

* * * * *